US012562928B2

(12) United States Patent
Nelson et al.

(10) Patent No.: US 12,562,928 B2
(45) Date of Patent: Feb. 24, 2026

(54) CRYPTOCURRENCY MINING PROGRESSIVE POOLS

(71) Applicant: IGT, Las Vegas, NV (US)

(72) Inventors: Dwayne Nelson, Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/243,478

(22) Filed: Sep. 7, 2023

(65) Prior Publication Data

US 2023/0421400 A1     Dec. 28, 2023

Related U.S. Application Data

(63) Continuation of application No. 17/387,088, filed on Jul. 28, 2021, now Pat. No. 11,792,026.

(51) Int. Cl.
*G07F 17/32*      (2006.01)
*H04L 9/00*       (2022.01)
*H04L 9/32*       (2006.01)

(52) U.S. Cl.
CPC .............. *H04L 9/50* (2022.05); *G07F 17/323* (2013.01); *G07F 17/3239* (2013.01); *H04L 9/3236* (2013.01); *G07F 17/3234* (2013.01); *G07F 17/3258* (2013.01)

(58) Field of Classification Search
CPC ....... G04L 9/50; G04L 9/3236; G07F 17/323; G07F 17/3239; G07F 17/3234; G07F 17/3258; H04L 9/50; H04L 9/3236
See application file for complete search history.

(56) References Cited

U.S. PATENT DOCUMENTS

| | | | |
|---|---|---|---|
| 6,319,125 | B1 | 11/2001 | Acres |
| 8,449,378 | B2 | 5/2013 | Michaelson et al. |
| 10,741,017 | B2 | 8/2020 | Silva |
| 10,885,740 | B2 | 1/2021 | Higgins et al. |
| 11,792,026 | B2 | 10/2023 | Nelson et al. |
| 2003/0036425 | A1 | 2/2003 | Kaminkow et al. |
| 2003/0050111 | A1 | 3/2003 | Saffari |
| 2003/0171148 | A1 | 9/2003 | Weitz |
| 2004/0236944 | A1 | 11/2004 | Walker et al. |
| 2006/0052169 | A1 | 3/2006 | Britt et al. |
| 2006/0116207 | A1 | 6/2006 | DeLeon |
| 2007/0057464 | A1 | 3/2007 | Cockrell, Jr. |
| 2008/0242421 | A1 | 10/2008 | Geisner |
| 2013/0244787 | A1 | 9/2013 | Hafezi |

(Continued)

OTHER PUBLICATIONS

"AntMiner," Bitcoin Wiki, last edited Apr. 6, 2014, 1 page [retrieved online from: en.bitcoin.it/w/index.php?title=AntMiner&oldid=46022].

(Continued)

*Primary Examiner* — Jeffrey K Wong
(74) *Attorney, Agent, or Firm* — Sheridan Ross P.C.

(57)     ABSTRACT

A gaming system and method selects a subset of gaming devices to operate in a digital ledger validation mode to validate a set of data records defining a digital ledger, allocates, to each gaming device, a respective work unit, receives, at an electronic address associated with the gaming server, an electronic record defining a reward, tracks play activity at each of the plurality of gaming devices, and, based on the tracked play activity, selects a player from among multiple players to receive the reward.

20 Claims, 10 Drawing Sheets

(56) References Cited

U.S. PATENT DOCUMENTS

| | | |
|---|---|---|
| 2018/0139042 A1 | 5/2018 | Binning et al. |
| 2020/0211324 A1* | 7/2020 | Silva .................. G07F 17/3232 |
| 2020/0213087 A1 | 7/2020 | Mazzarella |
| 2020/0273006 A1 | 8/2020 | Higgins et al. |
| 2022/0269324 A1* | 8/2022 | Rettger ..................... G06F 1/26 |
| 2022/0292489 A1* | 9/2022 | Mackay ................. G06F 21/64 |
| 2024/0198236 A1 | 6/2024 | Tyrell et al. |

OTHER PUBLICATIONS

"Cryptocurrency," Wikipedia, last edited Ju. 3, 2021, 24 pages [retrieved online from: en/wikipedia.org/wiki/Cryptocurrency].

"Directed Acyclic Graph (DAG)," CoinMarketCap, 2021, 4 pages [retrieved online on Jun. 8, 2021 from: coinmarketcap.com/alexandria/glossary/directed-acyclic-graph-dag].

"Distributed ledger," Wikipedia, last edited May 28, 2021, 3 pages [retrieved online on Jun. 9, 2021 from: en.wikipedia.org/wiki/Distributed_ledger].

"How do mining pools work?" Bitcoin Stack Exchange, 2018, 4 pages [bitcoin.stackexchange.com/questions/21769/how-do-mining-pools-work].

"Industrial Grade Gaming Products," American Portwell Technology, Inc., 2021, 9 pages [retrieved online on May 11, 2021 from: portwell.com/products/gaming.php].

"Mining pool," Wikipedia, last updated Apr. 25, 2021, 5 pages [retrieved online from: en.wikipedia.org/w/index.php?title=Mining_pool&oldid=1019715324].

"Mining Pools Explained," Binance Academy, Apr. 21, 2020, updated Apr. 28, 2021, 9 pages [retrieved online from: academy.binance.com/en/articles/mining-pools-explained].

"Pooled mining," Bitcoin Wiki, last edited on Jun. 23, 2020, 4 pages [retrieved online from: en.bitcoin.it/w/index.php?title=Pooled_mining&oldid=67988].

"Progressive jackpot," Wikipedia, last edited Feb. 1, 2021, 5 pages [retrieved online from: en.wikipedia.org/w/index.php?title=Progressive_jackpot&oldid=1004150597].

"The SAS system," University of Hawaii, Aug. 2010, 3 pages [retrieved online from: www2.hawaii.edu/~halina/603/SASintro.pdf].

Costello "How does a Bitcoin mining pool work?" Hashmart blog, Jan. 17, 2020, 9 pages [retrieved online from: medium.com/hashmart-blog/how-does-a-bitcoin-mining-pool-work-9cb04b239d30].

Frankenfield "Proof of Work (PoW)," Investopedia, updated Mar. 29, 2021, 10 pages [retrieved online from: www.investopedia.com/terms/p/proof-work.asp].

Hong "How Does Bitcoin Mining Work?" Investopedia, May 4, 2021, 22 pages [retrieved online from: www.investopedia.com/tech/how-does-bitcoin-mining-work/].

Lee "Explaining Directed Acylic Graph (DAG), The Real Blockchain 3.0," Forbes, Jan. 22, 20218, 5 pages [retrieved online from: www.forbes.com/sites/shermanlee/2018/01/22/explaining-directed-acylic-graph-dag-the-real-blockchain-3-0/?sh=37595245180b].

Seth "How Do Cryptocurrency Mining Pools Work?" Investopedia, Oct. 29, 2020, 11 pages [retrieved online from: www.investopedia.com/tech/how-do-mining-pools-work/].

Tulic "How do Mining Pools Work And How To Choose a Pool To Join?" CaptainAltcoin.com, Oct. 6, 2019, 11 pages [retrieved online from: captainaltcoin.com/what-is-pool-mining].

Official Action for U.S. Appl. No. 17/387,088, dated Nov. 25, 2022 8 pages Restriction Requirement.

Notice of Allowance for U.S. Appl. No. 17/387,088, dated Jun. 8, 2023 10 pages.

Official Action for U.S. Appl. No. 18/243,489, dated Sep. 20, 2024 23 pages.

Official Action for U.S. Appl. No. 18/243,489, dated Feb. 6, 2025 15 pages.

"Cryptocurrency wallet," Wikipedia, last edited Sep. 16, 2021, 6 pages [retrieved online Mar. 30, 2022 from: https://en.wikipedia.org/w/index.php?title=Cryptocurrency_wallet&oldid=1044729968].

LadyNarayen "Returning Players—Welcome Back Rewards," Reddit, 2022, 7 pages [retrieved online from: www.reddit.com/r/PunishingGrayRaven/comments/qj5bva/returning_players_welcome_back_rewards/?rdt=50246].

Pinky Dinky, "Punishing Gray Raven Review," Medium, Apr. 19, 2020, 19 pages [retrieved online from: medium.com/@pinkydinkyhere/punishing-gray-raven-review-bc62cfc8d5bc].

Thaine"Homomorphic Encryption for Beginners: A Practical Guide (Part1)," Medium, Dec. 26, 2018, 13 pages [retrieved online Oct. 5, 2021 from: https://medium.com/privacy-preserving-natural-language-processing/homomorphic-encryption-for-beginners-a-practical-guide-part-1-b8f26d03a98a].

Notice of Allowance for U.S. Appl. No. 18/243,489, dated May 6, 2025 5 pages.

Notice of Allowance for U.S. Appl. No. 18/243,489, dated Jul. 15, 2025 12 pages.

* cited by examiner

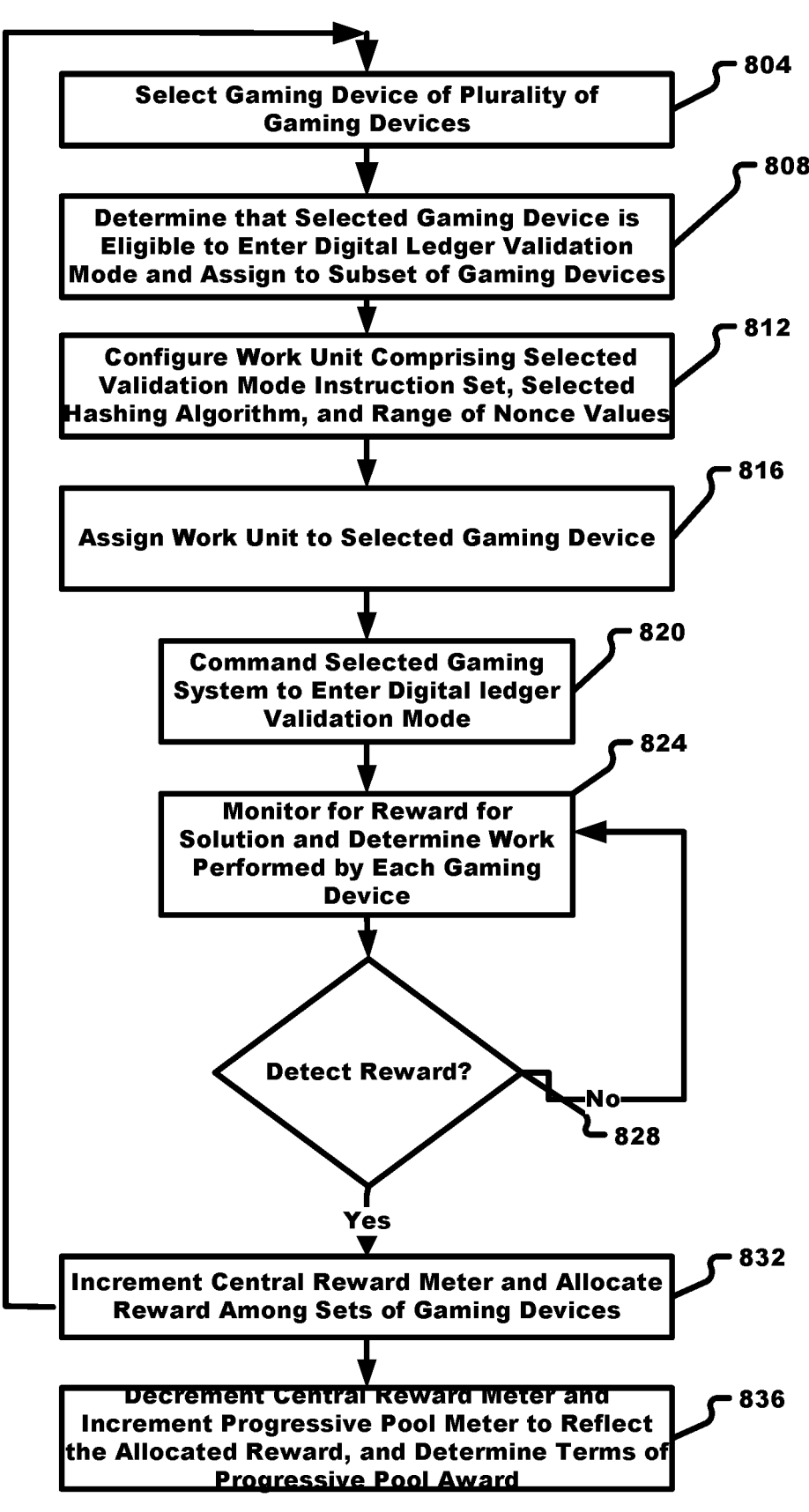

Select Gaming Device of Plurality of Gaming Devices — 804

Determine that Selected Gaming Device is Eligible to Enter Digital Ledger Validation Mode and Assign to Subset of Gaming Devices — 808

Configure Work Unit Comprising Selected Validation Mode Instruction Set, Selected Hashing Algorithm, and Range of Nonce Values — 812

Assign Work Unit to Selected Gaming Device — 816

Command Selected Gaming System to Enter Digital ledger Validation Mode — 820

Monitor for Reward for Solution and Determine Work Performed by Each Gaming Device — 824

Detect Reward? — No — 828

Yes

Increment Central Reward Meter and Allocate Reward Among Sets of Gaming Devices — 832

Decrement Central Reward Meter and Increment Progressive Pool Meter to Reflect the Allocated Reward, and Determine Terms of Progressive Pool Award — 836

*Fig. 8*

Determine Whether Each Gaming Device is Free of Player Interaction for Determined Period of Time ⌐ 1004

Based on Random Input Value, Select Gaming Device that is Currently Being Played by Player or Player to Receive Progressive Pool ⌐ 1008

Increment Reward Meter of Player to Reflect Progressive Pool Award ⌐ 1012

CRYPTOCURRENCY MINING PROGRESSIVE POOLS

CROSS REFERENCE TO RELATED APPLICATIONS

The present application is a continuation of and claims priority to U.S. application Ser. No. 17/387,088, filed Jul. 28, 2021, the entire disclosure of which is hereby incorporated by reference.

BACKGROUND

The present disclosure is related to gaming systems and devices and, in particular, the use of such devices in connection with validating digital ledgers.

Bitcoin miners assemble a block of potential Bitcoin transactions then attempt to solve a very different math problem, called a "proof of work", "proof of stake", or hybrid scheme of proof of work and proof of stake. It is computationally difficult to solve the problem but very easy to verify so it takes many computational resources to solve. The Bitcoin mining award is typically a specified number of bitcoins (BTC). Additionally, the miner will receive the substantial fees for each transaction in the block upon a successful mine. Similar frameworks are provided by other cryptocurrencies, including Etherium, Litecoin, Tether and Monero.

As gaming systems, such as electronic gaming machines (EGMs) and lottery vending machines, offer more features to players, the price of gaming systems has continued to rise. The higher price is commonly not offset by high levels of usage. A gaming system typically has significant idle time between play sessions, particularly late at night or early in the morning that may be used for cryptocurrency mining. Gaming systems typically cannot be turned off or placed in power saving modes of operation as they must be constantly ready for use and advertise, via an attract mode, to potential players.

BRIEF SUMMARY

In certain embodiments, the present disclosure relates to a gaming system that can validate digital ledgers. In some embodiments, a method for digital ledger validation in a gaming system comprises: selecting, by a processor and from a plurality of gaming devices, a subset of gaming devices to operate in a digital ledger validation mode to validate a set of data records representing a digital ledger; allocating, by the processor to each gaming device in the subset of gaming devices, a respective work unit comprising a range of nonce values; when a gaming device in the subset of gaming devices has generated a hash value that satisfies a predetermined criteria, receiving, by the processor at an electronic address associated with the processor, an electronic message defining a reward; when the gaming device in the subset of gaming devices that generated the hash value is not currently being played, selecting, by the processor based at least in part on a random input value, a player from among multiple players of the plurality of gaming devices to receive at least a portion of the reward; and updating, by the processor, a set of data structures associated with an account of the selected player to reflect the at least a portion of the reward.

In some embodiments, a gaming system comprises: a display to render gaming information in a gaming session to a player, a user interface to receive player input, a communications interface that facilitates communications with a gaming server, a processor coupled with the display, user interface, and communications interface, and a computer memory coupled with the processor, the computer memory comprising a processor-executable set of instructions that, when executed by the processor, causes the processor to: receive, from the server, a set of validation rules comprising a range of nonces; generate, based on the nonces in the range of nonces, a plurality of hash values of selected transaction data in a digital ledger to attempt to validate selected transaction data in the digital ledger; determine that a different gaming machine was first to validate successfully the selected transaction in the digital ledger; in response to determining that the different gaming machine was first to validate successfully the selected transaction in the digital ledger, notify the server whether a player is currently interacting with the user interface; and when a player is currently interacting with the user interface and responsive to successful validation of the selected transaction in the digital header, update the display to include a notification that the currently interacting player has received at least a portion of a reward for validating successfully the selected transaction data.

In some embodiments, a server comprises a communications interface to receive and send communications over a network; a processor coupled with the communications interface; and a computer memory coupled with the processor. The computer memory comprises a processor-executable set of instructions that, when executed by the processor, causes the processor to select, from a plurality of gaming devices, a subset of gaming devices to operate in a digital ledger validation mode to validate a set of data records defining a digital ledger; allocate, to each gaming device in the subset of gaming devices, a respective work unit comprising a range of nonces; when a gaming device in the subset of gaming devices has generated a hash that satisfies a predetermined criteria, receive, at an electronic address associated with the gaming server, an electronic record defining a reward; track play activity at each of the plurality of gaming devices; select a player from among multiple players of the plurality of gaming devices to receive at least a portion of the reward, the selected player concurrently playing a gaming device of the plurality of gaming devices that is different from the gaming device in the subset of gaming devices that generated the hash; and update a set of data structures associated with an account of the selected player to reflect the at least a portion of the reward.

Additional features and advantages are described herein and will be apparent from the following Description and the figures.

BRIEF DESCRIPTION OF THE SEVERAL VIEWS OF THE DRAWINGS

FIG. 8 is a flow diagram depicting a method of controlling a pool of gaming devices operating in the validation mode in accordance with embodiments of the present disclosure;

DETAILED DESCRIPTION

Figure 1:
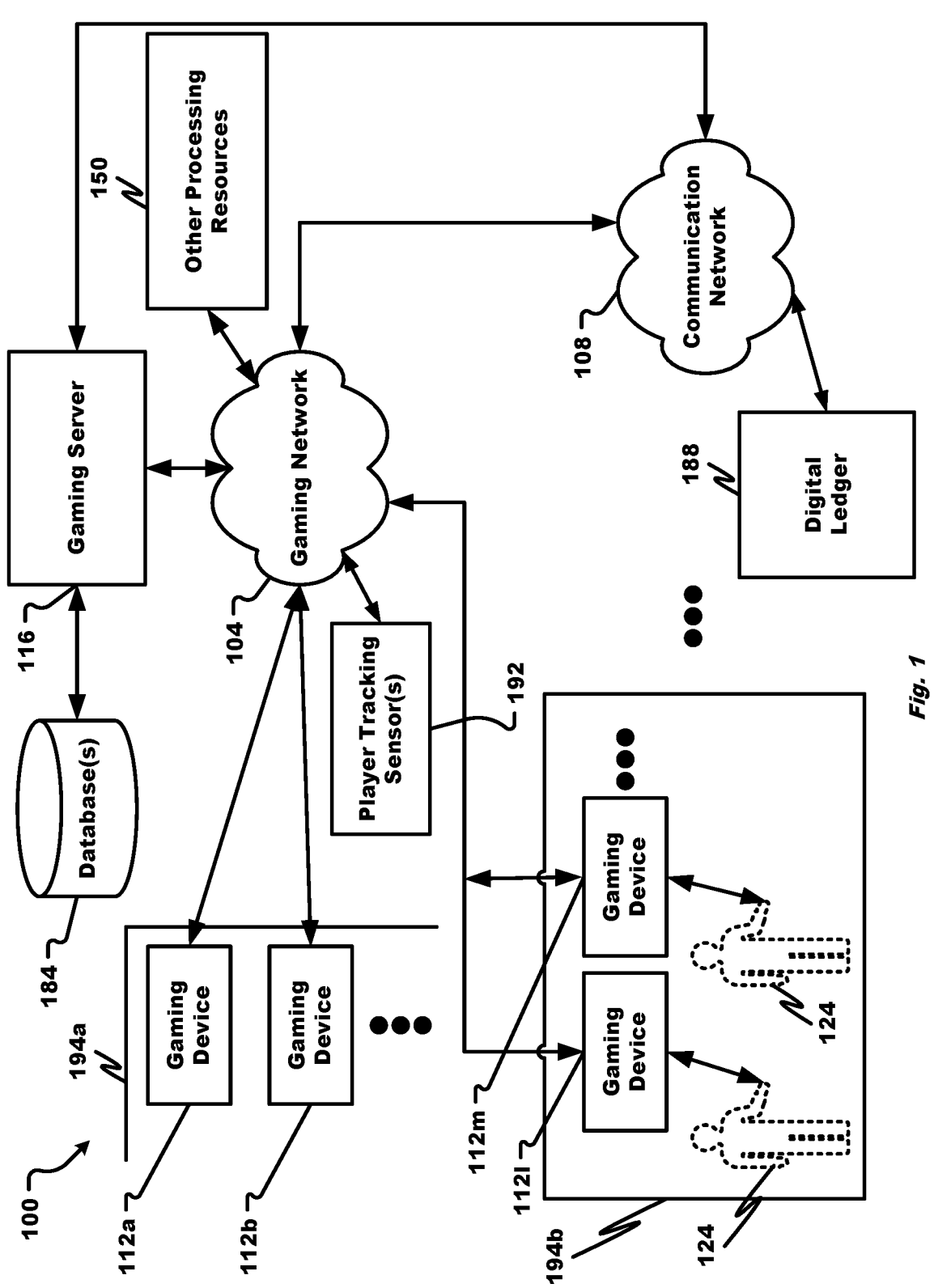
FIG. 1 is a block diagram of a digital ledger validation network in accordance with embodiments of the present disclosure.

Embodiments of the present disclosure will be described in connection with a gaming device having a capability to validate records in a digital ledger. While certain embodiments of the present disclosure will reference the use of gaming devices, such as an Electronic Gaming Machine (EGM), Electronic Gaming Table (EGT), lottery vending machine, virtual gaming machine, or video gaming gambling machine (VGM), as a device that validates digital ledger records, it should be appreciated that embodiments of the present disclosure can be used with any computer-controlled gaming device or collection of gaming devices or other devices controlled by a gaming server.

Embodiments of the present disclosure will be described in connection with a gaming system that can validate digital ledger records while also being accessible to players for gaming sessions. A typical gaming device can operate discretely in different operating modes comprising not only a digital ledger validation mode but also a gaming mode in which a player is involved in a gaming session on the gaming device and an attract mode that is free of player interaction and displays content to attract player attention. In any of these modes, the gaming devices are equipped with processing resources (e.g., central processing unit (CPU) and graphics card unit (GPU) to operate the gaming functions and display a game, such as slot or poker, sports wagering, and electronic table gaming. These CPU and GPU resources can, in any of the modes, be used for mining cryptocurrencies (or validating digital ledgers for tracking cryptocurrency transactions), or otherwise performing digital ledger validation, in addition to performing gaming functions. The gaming devices can operate in the digital ledger validation mode all the time but increase or decrease the validation according to the amount of game play or amount wagered or amount of CPU and/or GPU needed to perform the casino functions. The EGMs could also mine only when idle and no game is in progress.

In some embodiments, the gaming device is also equipped with additional hardware, such as additional CPUs, video cards, or a dedicated ASIC, for cryptocurrency mining. In some embodiments a casino might use additional mining hardware external to the gaming devices, such as computers, virtual machines, or ASIC-equipped computing devices. Any dedicated devices, such as an ASIC miner, can execute continuously, regardless of the operating mode of the gaming device.

In some embodiments, none of the gaming devices are mining cryptocurrency, but rather other non-gaming devices, such as servers or ASIC devices, controlled by the gaming server perform the mining.

In some embodiments, the hardware used in cryptocurrency mining can be run outside of the casino in a location dedicated to running cryptocurrency hardware at low cost in order to gain cost efficiencies. For example, the cryptocurrency mining hardware could be running in a secondary data center with low-cost power and low-cost cooling.

The cryptocurrency mining reward can be awarded to players as a bonus prize, mystery progressive, or standard progressive. In these embodiments the casino is attempting to maximize computational efficiency and mine cryptocurrency as a fun promotion that yields benefits to players.

In some embodiments, the gaming devices are centrally controlled by a gaming server and divided into subsets of gaming devices with each subset operating, continuously or discontinuously, in a digital ledger validation mode to validate a set of data records representing a digital ledger. The gaming server can avoid processing redundancy and increase computational efficiency by allocating, to each gaming device in each subset of gaming devices, a respective work unit comprising a range of nonce values for which the given gaming device is responsible for in attempting to determine a solution to the digital ledger problem. As will be appreciated, a nonce is an abbreviation for "number only used once," which, in the context of cryptocurrency mining, is a number added to a hashed—or encrypted—block in a blockchain that, when rehashed, meets predetermined criteria, such as a difficulty level restriction.

The gaming server can group gaming devices into collaborative groups, or subsets, to provide combined processing resources that are more likely to solve the increasingly difficult task of validating a digital ledger. Gaming devices can globally work together. In some embodiments, the gaming devices can be connected into a subset within a casino while in other embodiments the gaming devices can be connected in larger subsets across casinos. The latter is the most likely to achieve a large pool and allow gaming devices to reach outside the casino network and communicate with the cryptocurrency nodes on the internet.

Additionally, casinos might include, in a subset, not only gaming devices but also cryptocurrency mining devices external to the gaming devices. In some embodiments, the gaming server can pool gaming devices together into a subset, if one gaming device successfully mines a block of the digital ledger allocate a share of the mining reward to the subset, and award it to one or more players of a gaming device in the subset as a mystery progressive.

Like other progressives, the gaming devices could display on the screen the current potential award or separate signage could show the current progressive amount. In some embodiments the gaming devices communicate directly with a crypto awarding component in the gaming server, and in other embodiments there are servers, hosts or other communication equipment between the two. The crypto awarding component can be in communication with the gaming devices or with other crypto awarding components running at the various connected casinos. In the latter method, the crypto awarding component in the gaming server communicates with existing bonusing or mystery progressive systems in each casino to trigger an award to a player or gaming device using that system, or to contribute to a prize pool managed by those existing bonusing or mystery progressive systems.

In some embodiments, the casino has a bonusing or mystery progressive server. This server communicates with the crypto awarding component. The crypto awarding component can instruct the bonusing server to award credits, currency or change progressive levels. The component can also increment the pool contributions to a pool managed by the existing bonusing or mystery progressive server. This increment could automatically trigger a hit of that server (e.g., if the server is a lucky-number-based lucky coin server). In many configurations, the crypto awarding component and progressive server are integrated into the gaming server that controls all of the gaming devices.

The gaming server can subdivide gaming devices into subsets based on any number of factors. Exemplary factors include an operating mode of a given gaming device, a game type associated with the given gaming device (e.g., slots for an EGM and poker or blackjack for a EGT), a game theme associated with the given gaming device, a player denomination associated with the given gaming device, a total player play associated with the given gaming device, a player maximum bet associated with the given gaming device, an associated interacting player account status, a player decision related to a gaming session with or otherwise involving the given gaming device, an achievement of a player while playing the given gaming device, a bonus trigger associated with the given gaming device, a processing power of the given gaming device, an operating cost of the given gaming device, and/or a game event in a gaming session on the given gaming device.

The process of cryptocurrency mining can take many forms. In many applications, the process of guessing the hash starts in a block header containing a block version number, a timestamp, a hash used in a previous block, a hash of the Merkle Root, a nonce, and a target hash. Determining which string to use as the nonce requires a significant amount of trial-and-error, as it is a random string. A gaming device must guess a nonce, append it to the hash of the current header, rehash the value, and compare the rehashed value to the target hash. The range in which the nonce is guessed may alternatively or additionally be supplied by the "gaming server" or "crypto awarding host". If the rehashed value meets the predetermined criteria set forth in the target hash, which commonly requires the hash to be less than the target hash, then the block is added to the blockchain.

Cycling through solutions to guess the nonce is referred to as a proof of work. As will be appreciated, proof of stake (PoS), by contrast, is a consensus algorithm under which randomly chosen validation nodes (validators) stake native tokens (staking) of the blockchain network to propose or attest new blocks to the current blockchain. A validator will receive rewards by successfully adding blocks to the blockchain. In proof of stake systems, a miner typically can only mine blocks up to the percentage of coin market cap that the miner owns or controls. While the present disclosure is discussed primarily with reference to Bitcoin, it is to be understood that it is applicable to any cryptocurrency framework, including Etherium™, Litecoin™, Tether™ and Monero™. While Bitcoin uses the proof of work (nonce, hash computation, etc.), other cryptocurrencies use other proof of work algorithms, which generally involve performing one or more other intractable operations. Such operations are selected to be hard to reverse but easy to verify. Computing hashes on a block chain is just an example of an intractable problem. Other cryptocurrencies may not involve a verification of a chain (list). It is further to be understood that, while the present disclosure is discussed primarily with reference to digital ledgers, it can be applied to a cryptocurrency based on the use of a directed acyclic graph to track cryptocurrency transactions.

In accordance with the present disclosure, when a gaming device finds the solution, or hash value, the gaming device is awarded the block. and the gaming server receives a cryptocurrency reward, such as the award and transaction fees earned for successfully mining a cryptocurrency block. When a gaming device in the subset of gaming devices has generated a hash value that satisfies the predetermined criteria, the gaming server or successful gaming device typically receives, at an electronic address associated with the gaming server, an electronic message defining the reward. The gaming server can alternatively or additionally be notified by the gaming device that successfully validated the digital ledger, by another component within the casino, by a connected component outside of the casino, or by the blockchain itself of the cryptocurrency reward. In the latter method, a successful mining would yield an entry into the cryptocurrency blockchain that identifies the gaming device that successfully mined the block. The gaming server could simply monitor for successful mining and compare that against its known list of gaming devices. To effectively implement this approach, the gaming server tracks which gaming devices are mining at which properties.

In one embodiment, the gaming server may determine where and how to allocate the mining funds. The gaming server can allocate the reward amongst the various subsets of gaming devices in any suitable fashion, such as using subset weightings based on the work performed (e.g., computational resources consumed) by the subset in attempting to solve the predetermined criteria, a random input value generated by a random or pseudorandom number generator and assigned to each subset that is mapped against a random value indexed weighting, a share value assigned to the subset of gaming devices, a total amount of computational resources in each subset, and the like. In some embodiments, the weighting could be based on the computational contribution of each subset of gaming devices in a casino. The computational contribution can be computed as a number of computations performed in the effort of mining or on any other basis known to those of skill in the art. This can be an appropriate basis because some gaming devices might be idle and able to dedicate all their resources to computing cryptocurrencies while other gaming devices might be busy being played, e.g., slot machines, and have less resources available for cryptocurrency mining.

In some embodiments, the gaming server allocates the reward between subsets of gaming devices based on a respective share assigned to each subset of gaming devices, the respective share being assigned based on a relative contribution of each of the subset of gaming devices towards generating the hash value that meets the predetermined criteria. The respective share can be assigned (or accepted by the gaming server) based on receipt of an acceptable proof-of-work and/or proof of activity. A share commonly is a block "solution" that is not quite good enough to be published as an actual block but still good enough to indicate difficulty and measure processing resources applied to determining the solution. In this way, shares can be used to measure how much work a processor is performing with a much finer and more consistent granularity than actual block solutions. In some cryptocurrency implementations, every hash created has a 1 in ~4 billion ($2^{32}$) chance of being a valid solution. Based on accepted shares, the reward can be allocated among subsets of gaming devices based on pay-per-share (that bases reward payout based on accepted shares contributed by the gaming devices in each subset and is a function of the probability of finding a block in a share attempt), proportional (that pays out the reward in proportion to the number of the subset's shares with respect to the total number of shares for all subsets of gaming devices), shared minimum pay per share (that limits the reward payout to a maximum that the selected subset has earned), equalized shared maximum pay per share (that distributes the reward equally among all subsets regardless of relative levels of performance or contribution to mining), pay-per-last-N-shares (that calculates a subset's reward on a basis of N last shares instead of all shares for a prior round of mining), full pay per share (that applies the same allocation mechanism of pay per share but includes transaction fees as part of the reward), score-based (that pays out the reward according to the proportion of hash rate provided by the subset but gives more weight to more recent hash rate shares than earlier shares in a mining round), geometric (that grants a score to every new share relative to an already existing score and a score of future shares), double geometric (that applies a new parameter to the geometric scoring algorithm namely a cross-round leakage parameter that causes lower rewards during short duration rounds and larger rewards during longer rounds), recent shared maximum pay per share (that pays out the reward proportionally to the total number of shares contributed during the mining life of the subset of gaming devices but with more recent hash rate shares being weighted more heavily), capped pay per share with recent backpay (that pays as much as possible to each subset using a maximum pay per share reward system), and pay on target (that is modeled on pay per share and pays out rewards to a subset based on a difficulty returned to the gaming server rather than a difficulty served out by the gaming server) methodologies. As will be appreciated, many other algorithms may be used to compensate subsets based on accepted shares.

For example, the gaming server may determine to pay the mining award to a certain gaming device at a certain property using various schemes. In another embodiment, the individual casinos decide how to allocate the funds. For example, the gaming server would determine to provide the reward to casino A and casino A would determine its rules for distributing the money to players. In another embodiment, the participating casino sites may receive an award proportional to the level of blockchain computations performed by that site (or associated with that site).

The gaming server can transfer all or part of the reward to a progressive jackpot meter to be awarded as progressive prizes to gaming device players. In some embodiments, the portion of the reward allocated to a given subset of gaming devices is contributed to a corresponding progressive jackpot meter to be awarded to one or more players interacting with the subset of gaming devices. By way of illustration, the gaming server can receive notification of a reward for successful mining by a gaming device, increment a central set of data structures to reflect the reward, determine relative computational contributions of the gaming devices in first and second subsets of gaming devices toward a respective work unit, allocate, based on the relative computational contributions, the reward between the first and second subsets of gaming devices, and transfer an allocable share of the reward to each of the first and second subsets of gaming devices by decrementing the central set of data structures and incrementing a jackpot credit meter associated with each of the first and second subsets of gaming devices to reflect the reward allocation. In another embodiment, the gaming server can increment the appropriate progressive prize pools for the contributing sites or subsets of gaming devices to reflect the award, and then the win determination could happen as it traditionally would during normal game play.

In some embodiments, the progressive pool is a mystery progressive, and the progressive pool is awarded to a player of a gaming device in the subset. The gaming device can be selected on any basis, such as by a random input value output by a random number of pseudorandom number generator with the random number value being mapped to a plurality of machine identifiers indexed by potential random number value. A conventional mystery controller algorithm in the gaming server can use an existing triggering mechanism. For example, mystery controllers may only award their prize pool when a certain time has hit (lucky time), or when the pool value has hit a certain threshold level (so called "lucky number" or "lucky time" pools). When a triggering event occurs, then the controller selects gaming device(s) based upon a criteria, such as the one pointed out above, or it could even be weighted by player wager over a recent time period. The gaming server can responsively update a set of data structures associated with an account of the selected player to reflect the at least a portion of the reward. In order for a gaming device in the subset of gaming devices to be eligible to receive the portion of the reward, the gaming device must currently be interacting with a player. In other words, the gaming server tracks play activity at each of the plurality of gaming devices, such as by tracking physical contact of an input of each gaming device by an associated player, a credit balance associated with each gaming device, and/or a temporally recent operating mode of each gaming device.

In some embodiments, a mystery bonus controller in the gaming server tracks wagers via coin-in meter movement over a sliding window of time. For example, it can track coin-in meter (also known as the wager meter) movement over a sliding window of time (e.g., 1 minute), and conduct a drawing to determine the winner of the mystery progressive, where entries in the drawing are proportional to the amount wagered by each gaming device over the sliding window period. In some embodiments, the player rather than the gaming device is selected. In such embodiments, the gaming server selects a player from among multiple players of the plurality of gaming devices to receive a second portion of the reward. Players can be selected for the first and second subsets using different criterion or methodologies. Exemplary criterion or methodologies can be based on a random input value generated by a random or pseudorandom number generator, game type associated with a gaming session involving the player, game theme associated with a gaming session involving the player, a player denomination associated with the player, a total player play associated with the player, a maximum bet associated with the player, a player account status associated with the player, a player decision, a player achievement associated with the player, a bonus trigger associated with the gaming session involving the player, a processing power of a gaming device being played in the gaming session by the player, and/or a game event associated with the gaming session involving the player.

In some embodiments, selecting a player can be effected by randomly choosing any active playing session at all gaming devices in the subset, all gaming devices in the subset that are mining cryptocurrency, or gaming devices where players have a certain status such as a player card present or a player card for an account of a certain player loyalty level. In some embodiments, a player card may be required for the mystery progressive award. In another embodiment, the set of gaming devices that are eligible to receive the award could only include gaming devices where the player has placed some wager (any wager, or an amount over a threshold) within some time period. Player selection can be contingent or conditioned upon the selected player being in spatial proximity to a gaming device of the subset of gaming devices.

In some embodiments, selecting a player can be done by a random value output by a random or pseudorandom number generator. The random number value is mapped against a table of differing gaming events indexed by potential random number value to select a gaming event that must be first satisfied by the selected player. The gaming event can comprise a time of day, a number of game spins, an award amount, a wager amount, and/or a game event.

The various sets of data structures for the gaming server, jackpot credit meter, gaming device, and player can use separate data structures to track cryptocurrency and cash currency or non-cryptocurrency and, in some embodiments to avoid transaction fees, a fractional share of cryptocurrency in the cryptocurrency jackpot credit meter conditionally awarded to each winning player. The latter tracking capability enables the gaming server to delay transferring the cryptocurrency until the actual transfer is made directly to each player as a cash payment or to a cryptocurrency wallet of each player. For example, updating the set of data structures associated with an account of the selected player to reflect an award comprises updating separate sets of cash balance and a cryptocurrency balance data structures to reflect cash awards and cryptocurrency awards, respectively. In some embodiments, the gaming server can update the digital ledger to reflect transfer of a portion of the reward to an electronic address associated with a cryptocurrency wallet of a selected player. The cryptocurrency wallet can include public and private keys and/or a seed that can be used to receive and spend cryptocurrency.

Gaming devices can notify players when the gaming device is operating in the digital ledger validation mode and/or a cryptocurrency balance of a progressive jackpot associated with the gaming device. The gaming devices, for example, can have some indication (for a player or operator) that it is participating in the mining of cryptocurrency. The devices cany have signage marketing that the gaming device is currently mining, and that the player may receive an increased award from the mining or that the player may win cryptocurrency itself from the mining. The gaming device may show information such as mining statistics (e.g., age of latest digital ledger block, height of block, a status indicator of whether or not the block has been validated successful, identity of the successful miner, number of mining transactions attempted to validate the block, and current block size) and progress on mining the current block. In the embodiments where there is mining not performed by the gaming device, the gaming device or signage would notify players that the gaming device and the casino are mining for cryptocurrency to award to players.

Players can place wagers on which of the subset of gaming devices will be first to generate a hash value that satisfies the predetermined criteria. As noted, the gaming device can display information associated with the validation progress of that gaming device, or subset of gaming devices, or mining hardware associated with that gaming device or subset of gaming devices, or even information about the progress of mining on the digital ledger or blockchain in general. The gaming device hashrate and/or blocks per second rate metric(s) could also be posted. It would be beneficial to bet on machines which have the highest hashrate. This published value could fluctuate if the gaming device throttles its mining rate based upon player play. It is generally unknown when a nonce for a selected block on the blockchain will be found. The uncertainty enables players to be able to make side bets on a gaming device on when a next block will be found by any miner. In other embodiments, the player could make a bet on if a gaming device in a selected gaming device subset will successfully mine a next block on the blockchain. Other properties of successfully mined blocks on the blockchain can also be wagered on. These includes, but are not limited to, information such as time of successful mining, identity of the successful mining device, number of transactions in the block, the block size when successfully mined, and an address associated with the device or pool of devices that successful mines the block.

The ability to validate digital ledger records, particularly during idle periods, can not only provide additional revenue through crypto-currency mining to the owner and thereby decrease capital and operating costs but also more effectively use electrical energy. The dual abilities of the gaming system to earn revenue by playing game sessions and validating digital ledgers can further provide an enhanced gaming experience for players through the more powerful electronics required to effectively and efficiently validate records of digital ledgers. The use of the rewards from crypto-currency mining in progressive pools can increase player awards and provide higher levels of player excitement and satisfaction. Cryptocurrencies are very popular, and many people are interested in participating in this new form of currency. A gaming system operating as described in this disclosure can provide significant excitement around cryptocurrency awards in gaming. Additionally, with the ever-increasing price of cryptocurrencies such as Bitcoin, the cryptocurrency rewards and player progressive awards can be rather large.

With reference initially to FIG. 1, details of an illustrative digital ledger validation network 100 will be described in accordance with at least some embodiments of the present disclosure. The components of the digital ledger validation network 100, while depicted as having particular instruction sets and devices, is not necessarily limited to the examples depicted herein. Rather, a network according to embodiments of the present disclosure may include one, some, or all of the components depicted in the network 100 and does not necessarily have to include all of the components. For instance, the components may be distributed amongst a plurality of servers and/or gaming devices (e.g., an EGM, etc.) without departing from the scope of the present disclosure. The illustration of a single central gaming server 116 is for ease of discussion and should not be construed as limiting embodiments of the present disclosure to a single-server architecture.

The digital ledger validation network 100 is shown to include a gaming network 104 and a communication network 108. The gaming network 104 may correspond to a distributed set of devices that interconnect and facilitate machine-to-machine communications between one or multiple gaming devices 112a, b, . . . and 112l, m, . . . and the gaming server 116. The communication network 108 may correspond to a distributed set of devices that interconnect and facilitate machine-to-machine communications between the gaming server 116. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112a, b, . . . and 112l, m, . . . are configured to communicate with the gaming server 116 using devices that are owned and administered by the same entity that administers security settings of the gaming devices 112a, b, . . . and 112l, m, . . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112a, b, . . . and 112l, m, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112a, b, . . . and 112l, m, . . . may be distributed throughout a single property or premises (e.g., a single casino floor) or the gaming devices 112a, b, . . . and 112l, m, . . . may be distributed among a plurality of different properties. For example, the gaming devices 112a, b, . . . can be located at a first spatial location (such as a first casino) and 112l, m, . . . at a different second spatial location (such as a different second casino). In a situation where the gaming devices 112 a, b, . . . and 112l, m, . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 a, b, . . . and 112l, m, . . . may utilize the same or different types of communication protocols to connect with the gaming network 104. It should also be appreciated that the gaming devices 112 a, b, . . . and 112l, m, . . . may or may not present the same type of game to a player 124. It should be appreciated that a gaming device 112 a, b, . . . and 112l, m, . . . may correspond to one example of a gaming device. It should also be appreciated that the functions and features described in connection with a gaming device 112 a, b, . . . and 112l, m, . . . may be provided in any other type of gaming device without departing from the scope of the present disclosure.

In some embodiments, the gaming devices 112 a, b, . . . and 112l, m, . . . may be configured to communicate with a centralized management server in the form of the central gaming server 116. The central gaming server 116 may be configured to centrally manage games of chance, games of skill, or hybrid games of chance/skill played at the gaming devices 112 a, b, . . . and 112l, m, . . . (e.g., slot games), enable execution of a different game (e.g., a card game), monitor player 124 activity at the gaming devices 112 a, b, . . . and 112l, m, . . . , track player 124 association with a gaming device 112, facilitate communications with players 124 via the gaming devices 112 a, b, . . . and 112l, m, . . . , and/or perform any other task in connection with games played by a player 124 at gaming devices.

FIG. 1 depicts the gaming server 116 in communication with subsets 194a, b, . . . of gaming devices. Each subset of gaming devices is assigned differing ranges of work units in connection with digital ledger validation and treated as a single entity with respect to allocation of rewards from successful digital ledger validation. Stated differently, the gaming server 116 selects and assigns gaming devices to different and gaming device subsets based on any number of criteria. Exemplary factors include an operating mode of a given gaming device, a game type associated with the given gaming device (e.g., slots for an EGM and poker or blackjack for a EGT), a game theme associated with the given gaming device, a player denomination associated with the given gaming device, a total player play associated with the given gaming device, a player maximum bet associated with the given gaming device, an associated interacting player account status, a player decision related to a gaming session with or otherwise involving the given gaming device, an achievement of a player while playing the given gaming device, a bonus trigger associated with the given gaming device, a processing power of the given gaming device, an operating cost of the given gaming device, and/or a game event in a gaming session on the given gaming device.

In some embodiments, the gaming devices 112 may be distributed throughout a single property or premises (e.g., a single casino floor) or among a plurality of different properties. It should also be appreciated that the gaming devices 112 may or may not present the same type of game to a player 124. For instance, a first gaming system 112a may present a slot game to the player 124, a second gaming device 112 may correspond to a video poker machine, and other gaming devices may present other types of games or a plurality of different games for selection and eventual play by the player 124.

It should be appreciated that the central gaming server 116 may or may not be co-located with the gaming devices 112. Thus, one or more gaming systems 112 may communicate with the gaming server 116 over a WAN, such as the Internet. In such an event, a tunneling protocol or Virtual Private Network may be established over some of the communication network 108 to ensure that communications between a gaming device 112 and a remotely-located gaming server 116 are secured.

FIG. 1 also depicts the possibility of some personal gaming devices (e.g., smart phones, tablet computers, etc.) being paired with a gaming device 112, thereby enabling communications to flow between the personal gaming device on the one hand and the gaming device 112 on the other. This communication may utilize a proximity-based communication protocol, such as Bluetooth, BLE, NFC, WiFi, etc. One or more personal gaming devices of a third party 180 may not necessarily be paired with a gaming device 112, but such personal gaming devices may still be configured to communicate with the central gaming server 116 via the communication network 108. Communications between the gaming device 112 and personal gaming device may facilitate any number of combinations of gameplay opportunities.

The central gaming server 116 is in communication, via the gaming network 104, with one or more databases 184. The databases 184 may be configured to store one or multiple data structures that are used in connection with gaming interactive activities of players 124 and the digital ledger validation network 100. The databases can use any database model and compatible database management system. Examples of database models include relational databases, object-oriented databases, and non-relational databases, such as NoSQL and NewSQL databases.

The gaming server 116 and gaming devices 112 are in communication, via communication network 108, with a digital ledger 188. The digital ledger 188 is commonly a distributed ledger (also called a shared ledger or distributed ledger technology or DLT) that is a consensus of replicated, shared, and synchronized digital data geographically spread across multiple spatial locations. Unlike a centralized database, there is commonly no central administrator. The digital ledger 188 can employ Replicated Journal Technology, since the information is replicated in the nodes containing a full copy of the information and the information in the blocks is included in timely order, more in the form of an accounting journal than as an accounting ledger. Typically, the digital ledger 188 is a blockchain distributed ledger. The digital ledger 188 may be permissioned or permissionless and employ one or more consensus algorithms, e.g., proof of work, proof of stake, hybrids thereof, and hashgraph. The digital ledger 188 is commonly minable (one can claim ownership of new coins contributing with a node) and can be a non-blockchain DLT that can be in the form of a distributed cryptocurrency. While blockchain requires global consensus across all nodes, a non-blockchain DLT can achieve consensus without having to validate across the entire blockchain.

The gaming server 116 and gaming devices 112 are in communication, via gaming network 104, with one or more player tracking sensors 192. The player tracking sensors 192 can be any device or collection of devices that track player movement and/or activity to determine whether and when a player is playing a gaming device or is in spatial proximity to the gaming device. The player tracking sensors, for example, can be a motion sensor, camera with an image processor to detect a player and/or identity of the player, player portable personal device tracking mechanism (e.g., a wireless access point accessing and using the global positioning system coordinates of the device), motion sensor, infrared sensor, and voice detector that detects human voice and may or may not perform voice recognition. The gaming server 116 can use input from the player tracking sensor 192 and/or input from one or more gaming devices to determine whether or not a player is currently interacting with a selected gaming device. By way of illustration, the gaming server 116 can detect player presence by noticing game play at the gaming device 112; alternatively or in combination with a credit balance of the gaming device 112 detected by the gaming server 116. The gaming server 116 may alternatively or additionally determine player presence by identifying the presence of a player tracking card (which can be left behind) or an active player session from a username/login or use of personal gaming device (e.g., mobile device employing a cardless connect product that allows a player to log into the gaming device 112 using a mobile device).

Figure 2:
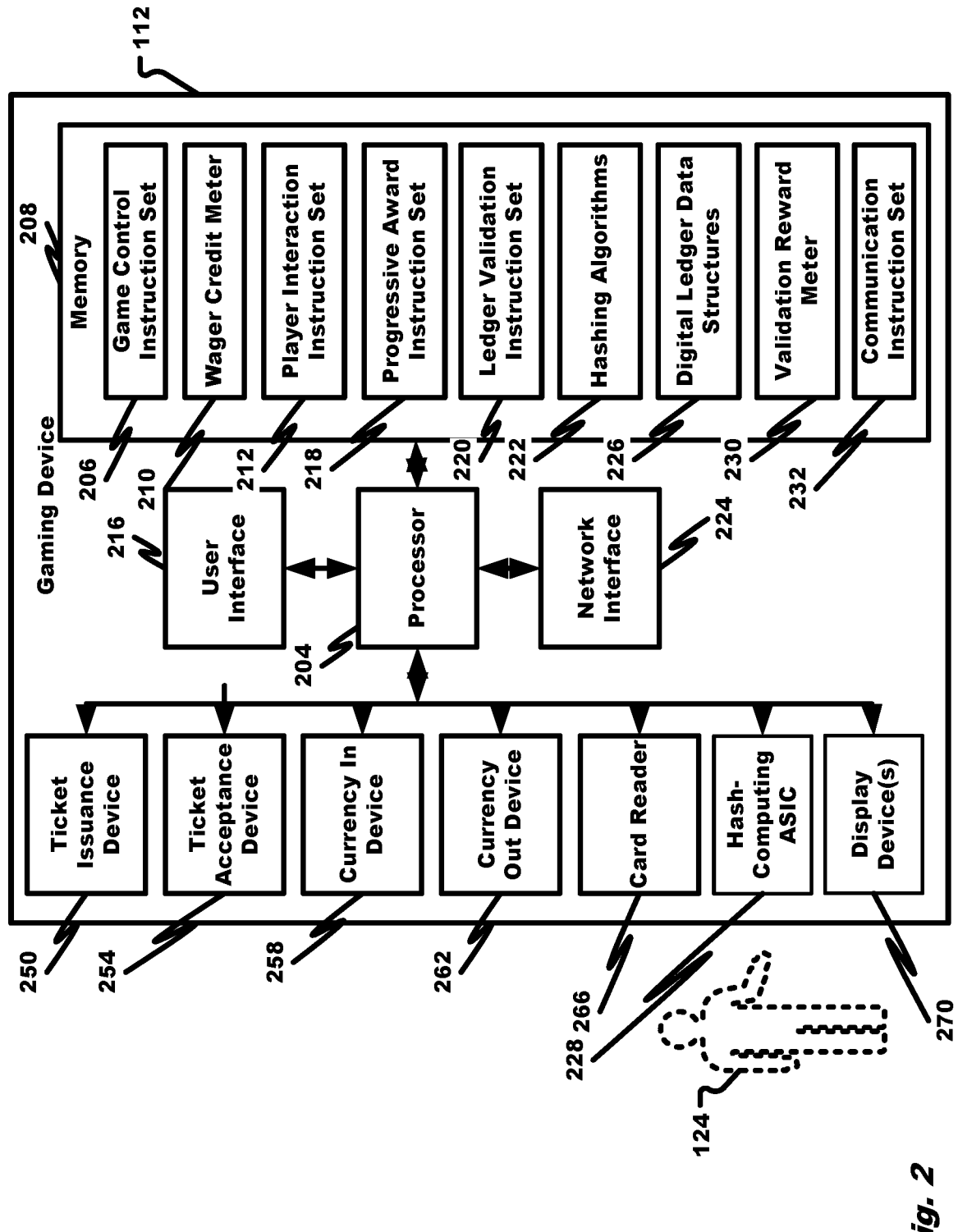
FIG. 2 is a block diagram depicting a gaming device in accordance with embodiments of the present disclosure.

With reference to FIG. 2, additional details of the components that may be included in a gaming device 112 will be described in accordance with at least some embodiments of the present disclosure.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a network interface 224, a user interface 216, and hash computing application-specific integrated circuit 226.

In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), or plurality of microprocessors that are configured to execute the instructions sets stored in memory 208. In some embodiments, the instruction sets stored in memory 208, when executed by the processor 204, may enable the gaming device 112 to provide game play functionality.

The nature of the network interface 224 may depend upon whether the network interface 224 is provided in cabinet- or player station-style gaming device 112 or a mobile gaming device 112. Examples of a suitable network interface 224 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 112 is connecting to a single gaming network 104 or multiple different types of gaming networks 104. For instance, the gaming device 112 may be provided with both a wired and wireless network interface 224 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling player 124 interaction with the gaming device 112. The user interface 216 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a game control instruction set 206, wager credit meter instruction set 210, player interaction instruction set 212, progressive award instruction set 218, validation mode instruction 220, hashing algorithms 222, digital ledger data structures 226, and reward meter 230. In addition to the instruction sets, the memory 208 may also be configured to store a random number generator or pseudorandom number generator (not shown) that is used by the game control instruction set 206, for example, to provide game outputs.

In some embodiments, the game control instruction set 206, when executed by the processor 204, may enable the gaming device 112 to facilitate one or more games with the player(s) 124. In some embodiments, the game control instruction set 264 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 120 of other non-players or third parties 180, subroutines that create, maintain and update player profiles of the player(s) to the game, subroutines that generate, such as by a random number generator or pseudorandom number generator, an outcome of the game, subroutines that alter, modify, or select game or display operations or functions in response to cryptocurrency mining activity, subroutines that calculate whether an outcome of the game has resulted in a win or loss during the game, subroutines for determining winnings and award payouts for the player(s) and others in the event of a win, subroutines for exchanging communications with another device, such as another gaming device 112 or gaming server 116, and any other subroutine useful in connection with facilitating game play at the gaming device 112.

The wager credit meter instruction set 210, when executed by the processor 204, may enable the gaming device 112 to facilitate a tracking of activity at the gaming system 116. In some embodiments, the wager credit meter 210 may be used to store or log information related to various player 124 activities and events that occur at the gaming device 112. The types of information that may be maintained in the wager credit meter instruction set 210 include, without limitation, player information, available credit information, wager amount information, and other types of information that may or may not need to be recorded for purposes of accounting for wagers placed at the gaming device 112 and payouts made for a player 124 during a game of chance or skill played at the gaming device 112. In some embodiments, the wager credit instruction set 210 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 112, and the like. In some embodiments, certain portions of the wager credit meter instruction set 210 may be updated in response to outcomes of a game of chance or skill played at the gaming device 112. In some embodiments, the gaming device 112 does not include a wager credit meter instruction set 210.

The player interaction instruction set 212, when executed by the processor 204, detects player activity at the gaming device 112 and notifies the gaming server 116 of an instance of detected player 124 interaction, a type of player 124 interaction detected, and a timestamp associated with the player 124 interaction. Types of player interaction can comprise, for example, physical contact of an input of the gaming device by a player 124, a current credit balance maintained by the credit meter instruction set 210 associated with the gaming device 112, and/or a current operating mode of each gaming device 112. The player gaming server 116 can use input from the player tracking sensor 192 along with input from the gaming device to determine whether or not a player is currently interacting with a selected gaming device. For example, player 124 interaction can be deemed to have occurred when the player 124 contacts physically the gaming system, when the player tracking sensor output indicates that the player 124, though not in physical contact with the gaming system, is determined by one or more cameras, motion sensors, microphones, or proximity sensors (such as ultrasonic, capacitive, photoelectric, inductive, or magnetic sensors), to be in spatial proximity to the gaming device 112, a player credit has been generated by or is otherwise stored in the wager credit meter, and a current operating mode of the gaming device 112 is a game mode and not an attract or digital ledger validation mode.

As noted, the game, attract, and digital ledger validation modes are commonly temporally discrete from one another and provide, via the user interface 216, different displayed information to the player 124. In the game and attract modes, the gaming device 112 may have processing resources available to validate digital ledger records.

The progressive award instruction set 218, when executed by the processor 204, is responsible for awarding a progressive jackpot to an associated player 124. The processor 204 notifies the player 124 that he or she has received the award, such as by sending a notification via a portable communication device of the player 124, rendering on a display the award notification, and activating lights and playing sounds to congratulate the player 124 for the award, and interacts with the gaming server 116 to maintain the reward meter to present the award to the player 124.

The ledger validation instruction set 220, when executed by the processor 204, can enable the gaming device 112 to validate transaction data in a digital ledger record against a set of validation rules or criteria, when the transaction data is successfully validated, execute a hashing algorithm to generate a hash of the transaction data and the hash of the second record in the digital ledger, and save the generated hash in a header of the selected record in the digital ledger. Multiple different ledger mode instruction sets, each comprising a set of validation rules, can be stored in memory 124 to validate multiple different types of digital ledgers. By way of example, each ledger mode instruction set corresponds to a particular type of cryptocurrency.

The memory 208 can also include the digital ledger data structures 226, hashing algorithms 222 to be employed in digital ledger validation, and a validation reward meter 156.

The digital ledger data structures 226 correspond to records of digital ledgers 188. The digital ledger data structures 226 are discussed below with reference to FIG. 4.

The hashing algorithms 222 can be a proof-of-work scheme, such as a scheme based on SHA-256, scrypt, CryptoNight, Blake, SHA-3, or X11, a proof-of-stake scheme, or a combined proof-of-work and proof-of-stake scheme. Multiple hashing algorithms 222 are commonly maintained in memory 208 as multiple types of digital ledgers may be validated by the gaming device 112. Each hashing algorithm corresponds to a different type of digital ledger.

The validation reward meter 230 records crypto-currency awarded to the gaming device 112 or subset of gaming devices 112 of which the gaming device 112 is a member for presenting a valid partial proof-of-work and/or proof-of-stake. The validation reward meter 230 can be linked to an operators account maintained by the gaming server 116 to deposit crypto-currency earnings from digital ledger validation activities.

The communication instruction set 232, when executed by the processor 204, may enable the gaming device 112 to communicate with the central gaming server 116 and/or a personal gaming device. In some embodiments, the communication instruction set 232 may include instructions that enable the gaming device 112 to pair with a personal gaming device and establish a communication channel with the personal gaming device via the pairing. As an example, the communication instruction set 232 may include instructions that enable NFC, Bluetooth®, Wi-Fi, or other types of communication protocols. It should be appreciated that the communication instruction set 232 may also be updated to reflect when a personal gaming device is paired with the gaming device 112 and such pairing information may include addressing information for the personal gaming device and/or identification information associated with the player 124 of the personal gaming device. Alternatively or additionally, the communication instruction set 232 may enable the gaming device 112 to identify a player 124 of the personal gaming device, identify a loyalty account associated with the player 124 of the personal gaming device, exchange information (e.g., send or receive) with a loyalty application operating on the personal gaming device, or combinations thereof. In some embodiments, the communication instruction set 232 may be configured to operate or drive the network interface 224 to facilitate direct or indirect communications with a personal gaming device.

While shown as separate instruction sets, it should be appreciated that any of the game control instruction set 206, wager credit meter instruction set 210, player interaction instruction set 212, progressive award instruction set 218, validation mode instruction 220, hashing algorithms 222, digital ledger data structures 226, and reward meter 230 may correspond to a subroutine of the game control instruction set 206 without departing from the scope of the present disclosure. The gaming device 112 can further include a hash-computing application-specific integrated circuit or ASIC 228. As will be appreciated, an ASIC is an integrated circuit (IC) chip customized for high-efficiency digital ledger mining. The ASIC 228 could also be in the form of an application-specific standard product (ASSP) chip. ASIC chips are typically fabricated using metal-oxide-semiconductor (MOS) technology, as MOS integrated circuit chips. The hash-computing ASIC can perform digital ledger validation in any operating mode of the gaming device 112. In this embodiment, the gaming device 112 communicates with the ASIC 228 over USB; however, the ASIC 228 could be connected by PCI or Ethernet to the gaming device processor. An example ASIC miner includes be the AntMiner™.

In another embodiment the ASIC miner connects to the host system rather than the EGM. The ASIC miner could reside within the EGM cabinet or outside the cabinet. The ASIC miner would notify the host of any successful mining and possibly the EGM with which it is associated for embodiments where the player successfully mining matters.

The gaming device 112 is further shown to include a ticket issuance device 250, a ticket acceptance device 254, a currency in device 258, a currency out device 262, and a card reader 266. The ticket issuance device 250 may be configured to print physical tickets, vouchers, or the like. The ticket acceptance device 254 may be configured to receive, scan, and/or recognize information from an input physical ticket, voucher, or cash. In some embodiments, the ticket issuance device 250 and ticket acceptance device 254 may operate in concert with a common piece of hardware that both accepts and produces physical tickets, vouchers, or the like. Tickets or vouchers printed by ticket issuance device 250 and recognizable by the ticket acceptance device 254 may correspond to physical lottery tickets, casino vouchers, paper coupons, and the like. Alternatively or additionally, the ticket issuance device 250 and/or ticket acceptance device 254 may be connected to ticket or cash reading hardware. In such an embodiment, the ticket issuance device 250 and ticket acceptance device 254 may operate as a driver and/or firmware component for the card reader.

Similarly, the currency in device 258 and currency out device 262 may include or operate in concert with a coin slot or any other type of coin delivery mechanism. The currency in device 258 and currency out device 262 may include hardware, drivers, or firmware that facilitate receiving or distributing tokens, coins, chips, etc. In some embodiments, the currency in device 258 may be configured to determine an amount of coins (an amount of tokens, an amount of chips, etc.), input at the coin slot and convert the values into credits for playing games. The currency out device 262 may correspond to hardware and software configured to output coins, tokens, chips, etc. if a player decides to cash out or convert playing credits back into coins, tokens, or chips, etc.

The card reader 266 may include hardware and/or software configured to read or accept any type of card, or portable credential (e.g., NFC, Bluetooth, Wi-Fi, etc.). In some embodiments, the card reader 266 may include hardware and/or software that enable contactless reading of a card, token, or portable credential. In some embodiments, the card reader 266 may include hardware and/or software that enable contact-based reading of a card, token, or portable credential (e.g., magstripe, chip reader, electrodes, card-receiving slot, etc.). It should be appreciated that the card reader 266 may be configured to receive and reader a card or portable credential, token, in any type of format (e.g., portable plastic card, magstripe card, key fob, etc.). It should also be appreciated that the card reader 266 may be configured to write information or data onto a card or portable credential. Furthermore, in some embodiments, the card reader 266 may be configured to read a player loyalty card in the form of a plastic credit-card shaped credential. In some embodiments, the card reader 266 may enable communications with a loyalty application operating on a player's personal gaming device.

The gaming device 112 may include one or more display devices 270 configured to render information, live video, communications windows, wagering interface windows, games, interactive elements, and/or other visual output to one or more display screens. The gaming device 112 may include one or more display controllers configured to control an operation of the display device 270. This operation may include the control of input (e.g., player input via the user interface 216, command input via the instruction sets in memory 208, combinations thereof, etc.), output (e.g., display, rendered images, visual game behavior, etc.) and/or other functions of the display device 270.

In an embodiment, the display device 270 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display.

In an embodiment, the display device 270 comprises one or more projectors to project virtual reality or augmented reality images during the escape room game. The projector(s) can be any projecting device that can project a computer image onto a projection augmented model (PA model) and/or a spatially augmented reality (SAR) model to provide the players 124 with augmented reality, augmented virtuality, and/or virtual reality computer-generated game environments. As will be appreciated, projection mapping, video mapping or SAR typically uses one or more optical devices or projectors that project a beam of light onto a selected escape room space to provide the player with the augmented reality, augmented virtuality, and/or virtual reality computer-generated game environments.

In an embodiment, the display device 270 comprises head-mounted displays worn by the players 124 to view the augmented reality, augmented virtuality, or virtual reality computer-generated game environments.

The display device 270 may include a display driver, a power supply, an input/output, and/or other components configured to enable operation of the display device 270. The display driver may receive commands and/or other data provided by the processor 204 and one or more of the instruction sets in memory 208. In response to receiving the commands, the display driver may be configured to generate the driving signals necessary to render the appropriate images to the display screen. The power supply may provide electric power to the components of the display device 270. In some embodiments, the power supply may include a transformer and/or other electronics that prevent overloading, condition power signals, and/or provide backup power to the display device 270. The input/output may correspond to one or more connections for receiving or exchanging information and/or video from components of the gaming device 112. The input/output may include an interconnection to the network interface 224. By way of non-limiting example, the input/output may include a high-definition multimedia interface (HDMI) input, Ethernet, composite video, component video, H.264, or other video connection.

Figure 3:
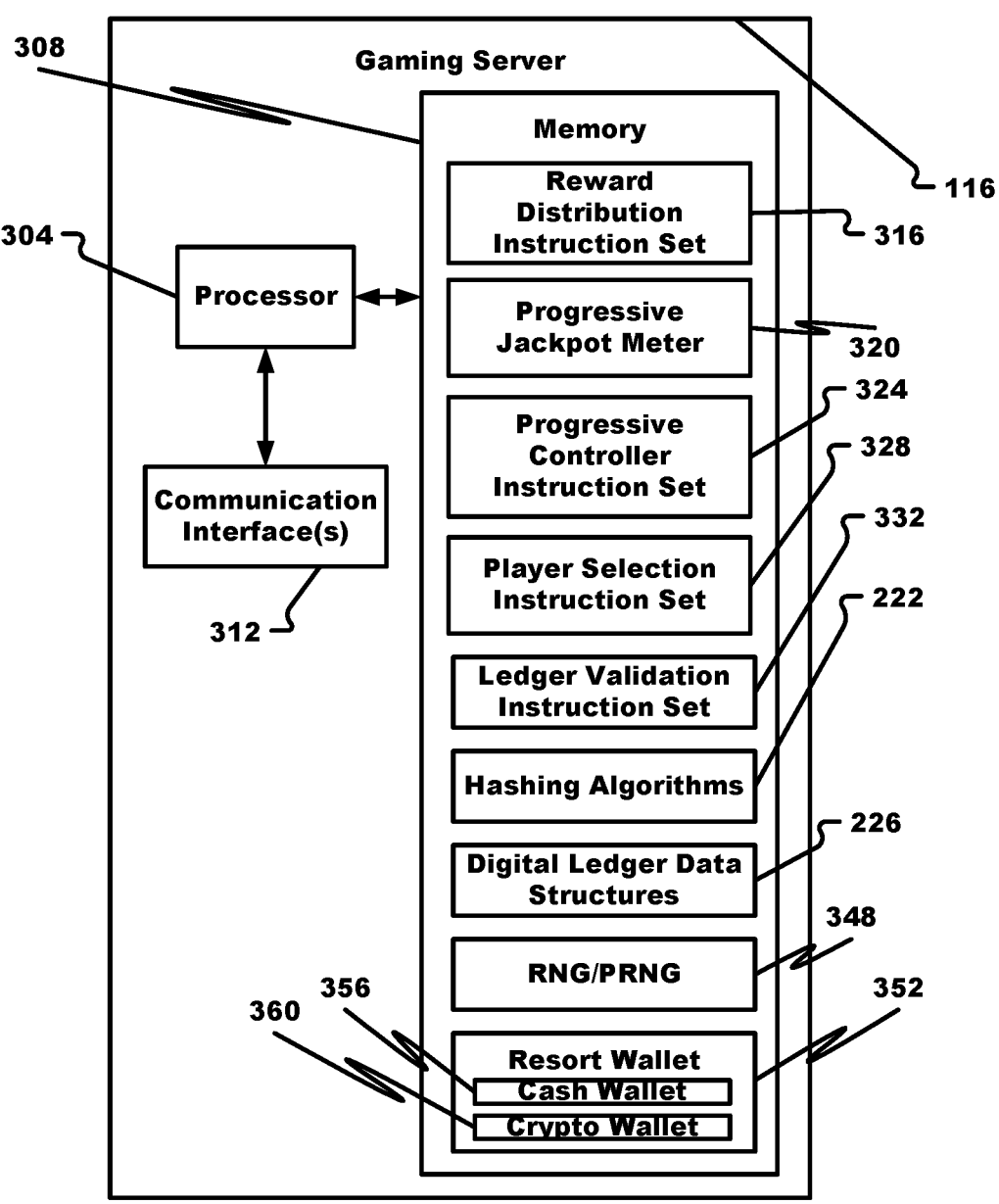
FIG. 3 is a block diagram depicting a digital ledger in accordance with embodiments of the present disclosure

With reference now to FIG. 3, additional details of a gaming server 116 will be described in accordance with embodiments of the present disclosure. The gaming server 116 is shown to include a processor 304, memory 308, and a plurality of communication interfaces 312. These resources may enable functionality of the gaming server 116 as will be described herein. For instance, a first communication interface 312 may provide the gaming server 116 with the ability to send and receive communication packets or the like over the gaming network 104. The first communication interface 312 may be provided as a network interface card (NIC), a network port, drivers for the same, and the like. Communications between the components of the gaming server 116 and other devices connected to the gaming network 104 may all flow through the first communication interface 312.

The gaming server 116 may also include a second communication interface 312 that facilitates communications with the mobile devices via the communication network 108. In some embodiments, the second communication interface 312 may be similar to the first communication interface 312. In some embodiments, the first and second communication interfaces may be provided in a single physical component or set of components, but may correspond to different communication channels (e.g., software-defined channels, frequency-defined channels, amplitude-defined channels, etc.) that are used to send/receive different communications to the mobile devices as compared to the gaming devices 112. In some embodiments, a single communication interface may facilitate communications with both the gaming devices 112 and mobile devices, especially if both devices communicate with the gaming server 116 via a common network.

The processor 304 may correspond to one or many computer processing devices. The processor 304 may be configured to execute one or more instruction sets stored in memory 308. Upon executing the instruction sets stored in memory 308, the processor 304 enables various authentication functions of the gaming server 116.

The memory 308 may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 308 include, without limitation, a reward distribution instruction set 316, a progressive jackpot meter 320, a progressive controller instruction set 324, player selection instruction set 328, ledger validation instruction set 332, hashing algorithms 222, reward distribution instruction set 316, digital ledger data structures 226, RNG/PRNG 348, and resort wallet 352. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein. Although not depicted, the gaming server 116 may include instructions that enable a processor to store data into the database 184 and retrieve information from the database 184. Alternatively or additionally, the database 184 or data stored therein may be stored internal to the gaming server 116 (e.g., within the memory of the server 116 rather than in a separate database).

In some embodiments, the reward distribution instruction set 316, when executed by the processor 304, may enable the gaming server 116 to allocate cryptocurrency rewards from successful digital ledger validation first among subsets of gaming devices and second to one or more gaming devices 112 or players 124 associated with each subset of gaming devices.

The first allocation among gaming device subsets can be done in any suitable fashion, such as using subset weightings based on the work performed (e.g., computational resources consumed) by the subset in attempting to solve the predetermined criteria, a random input value generated by a random or pseudorandom number generator and assigned to each subset that is mapped against a random value indexed weighting, a share value assigned to the subset of gaming devices, a total amount of computational resources in each subset, a shared game type and/or theme of games being played by gaming devices in the subset of gaming devices, a shared spatial location of the gaming devices in the subset of gaming devices, a cumulative amount of played game time attributable to the gaming devices in the subset of gaming devices, a shared type of gaming devices (e.g., EGMs, EGTs, etc.) in the subset of gaming devices, a set of business and/or marketing rules, and the like. In some embodiments, the weighting could be based on the computational contribution of each subset of gaming devices in a casino. The computational contribution can be computed as a number of computations performed in the effort of mining or on any other basis known to those of skill in the art. Because the gaming network is a private, trusted network and the gaming server 116 is able to determine computational contributions of gaming devices in each subset without fear of fraud, the contribution can be done by the gaming server 116 in the absence of a proof of work.

In some embodiments, the gaming server 116 allocates the reward between subsets of gaming devices based on a respective share assigned to each subset of gaming devices. The respective share can be assigned (or accepted by the gaming server) based on receipt of an acceptable proof-of-work and/or proof of activity. Based on accepted shares, the reward can be allocated among subsets of gaming devices based on pay-per-share, proportional, shared minimum pay per share, equalized shared maximum pay per share, pay-per-last-N-shares, full pay per share, score, geometric, double geometric, recent shared maximum pay per share, capped pay per share with recent backpay, or pay on target methodologies. As will be appreciated, many other algorithms may be used to compensate subsets based on accepted shares.

The progressive jackpot meter 320 is a set of data structures that is incremented or decremented to reflect the transfer of cash and cryptocurrency in and out of the meter. Typically, a progressive jackpot meter 320 is maintained for each subset of gaming devices 112. The progressive jackpot meter increases each time a game is played but the jackpot is not won and each time a cryptocurrency reward is allocated to the corresponding subset of gaming devices. When the jackpot is won, the data structures are reset to a predetermined value and resumes increasing as set forth above. The progressive jackpot meter can be a mystery or "must-hit-by" jackpot in which the meter value when the jackpot will hit is determined immediately after a preceding jackpot. This "must hit by value" is determined by a random number value generated by a random number generator or pseudorandom number generator and stored within as an encrypted value in the database. The jackpot meter value is disclosed to players by the gaming devices to be within a certain range. The jackpot commonly pays on the wager that causes the jackpot to reach or exceed a certain threshold, with the maximum value within the range being the "must-hit-by" amount. The jackpot meter 320 can have separate data structures tracking a currency or cash balance in the jackpot meter 320 and a cryptocurrency balance in the jackpot meter 320 as the conversion from cryptocurrency to cash fluctuates widely.

In some embodiments, the progressive controller instruction set 324, when executed by the processor 304, may enable the gaming server 116 to allocate the jackpot meter balance among gaming devices within a corresponding subset or to a player of a gaming device within the corresponding subset in any suitable fashion. In some embodiments, the portion of the reward allocated to a given subset of gaming devices is contributed to a progressive jackpot meter to be awarded to one or more players interacting with the subset of gaming devices. In some embodiments, the progressive pool is a mystery progressive, and the progressive pool is awarded to a player of a gaming device in the subset. The gaming device can be selected on any basis, such as by a random input value output by a random number of pseudorandom number generator with the random number value being mapped to a plurality of machine identifiers indexed by potential random number value.

In some embodiments, the player rather than the gaming device is selected. In such embodiments, the gaming server 116 selects a player 124 from among multiple players 124 of the plurality of gaming devices 112 in the subset to receive a portion of the reward. Exemplary criterion or methodologies can be based on a random input value generated by a random or pseudorandom number generator, game type associated with a gaming session involving the player, game theme associated with a gaming session involving the player, a player denomination associated with the player, a total player play associated with the player, a maximum bet associated with the player, a player account status associated with the player, a player decision, a player achievement associated with the player, a bonus trigger associated with the gaming session involving the player, a processing power of a gaming device being played in the gaming session by the player, and/or a game event associated with the gaming session involving the player.

In some embodiments, selecting a player can be effected by randomly choosing any active playing session at all gaming devices in the subset, all gaming devices in the subset that are mining cryptocurrency, or gaming devices where players have a certain status such as a player card present or a player card for an account of a certain player loyalty level. The random number value can be mapped against a table of differing gaming events indexed by potential random number value to select a gaming event that must be first satisfied by the selected player. The gaming event can comprise a time of day, a number of game spins, an award amount, a wager amount, and/or a game event. A player card may be required for the mystery progressive award. In another embodiment, the set of gaming devices that are eligible to receive the award could only include gaming devices where the player has placed some wager (any wager, or an amount over a threshold) within some time period.

In some embodiments, the progressive controller set causes the processor to allocate the jackpot meter balance based on the game type and/or game theme of a game being played by the gaming device 112 in addition to or as an alternative to selection of the player and/or gaming device.

In one exemplary embodiment, the progressive controller instruction set 324, when executed by the processor 304, tracks play activity at gaming devices in real time, and, based on this tracking, performs a random drawing for the gaming devices being actively played. The gaming server 116 can weigh the entries in the drawing by the amount of wagers a player has recently played, such as within the last five minutes. The processor 304 considers all of the gaming devices that are active on the floor and enables all players playing a game at those gaming devices to receive an entry into the drawing, weighs the number of entries that are allocated to each machine by the amount of coin in over a predetermined time window or interval, and then randomly picks a winner based on a random input value.

The random number generator or pseudorandom number generator (RNG/PRNG) 348 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGs), which generate numbers that look random, but are actually deterministic, and can be reproduced if the state of the PRNG were known. In some applications, the RNG/PRNG 348 uses computational algorithms that can produce long sequences of apparently random results, which are in fact determined by a shorter initial value, known as a seed value or key.

In one embodiment, the RNG/PRNG 348 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 348 is a cryptographic random number generator.

In some embodiments, the resort wallet 352 comprises a cash wallet set of data structures 356 that tracks a cash balance and a cryptocurrency wallet set of data structures 360 that tracks a cryptocurrency balances not only collectively for all of the gaming devices in the network 100 but also individually for each of the subsets of gaming devices. When cash or cryptocurrency is moved from a central resort wallet to a gaming device subset's wallet, the appropriate data structures in each set of data structures are updated to reflect the transfer.

In one embodiment, the resort wallet 352 is player-centric and not gaming device-centric (e.g., a first player has a first wallet and a second player has a different second wallet, etc.). Transactions with the wallet may be made from the gaming device, which allows the player to transfer funds from the player's resort wallet to the gaming device, or transfer funds from the gaming device to the player's resort wallet. In this embodiment, the gaming machine's credit meter acts a wallet associated with the gaming device, but there is no ownership of that wallet by the gaming device on the back-end.

The gaming server 116 can cause each of the gaming devices 112 to validate a different selected digital ledger 188 or two or more of the gaming devices 112 to validate a common selected digital ledger 188. In other words, two or more gaming devices 112 can execute, substantially concurrently, the same ledger validation instruction set 220 with respect to a common digital ledger 188. Operating collectively in parallel to validate a selected digital ledger 188 can increase rewards and revenue from ledger validation. Collective operation can increase the success rate of winning rewards due to greater hashing power being applied to solve the mathematical problem in the selected digital ledger 188.

The gaming server 116 can further assign a work unit to each gaming device 112 in each gaming device subset to avoid operational duplicity and increase digital ledger validation efficiency. The work unit can comprise a range of nonces to be attempted, a hashing algorithm to be employed, the predetermined criteria for successful digital ledger validation, and the digital ledger data structures for the assigned digital ledger 188.

While the progressive controller instruction set 324 is shown in the gaming server 112, it is to be understood that the progressive functions of the gaming server, such as progressive meters and progressive controller, can also be implemented on a simpler device called a progressive controller. As will be appreciated, a progressive controller is a small device that simply tracks the levels and awards them. Additionally the progressive functions can be implemented on the gaming device 112 itself, such that the gaming device is a progressive controller on behalf of itself and/or for other gaming devices.

Figure 6:
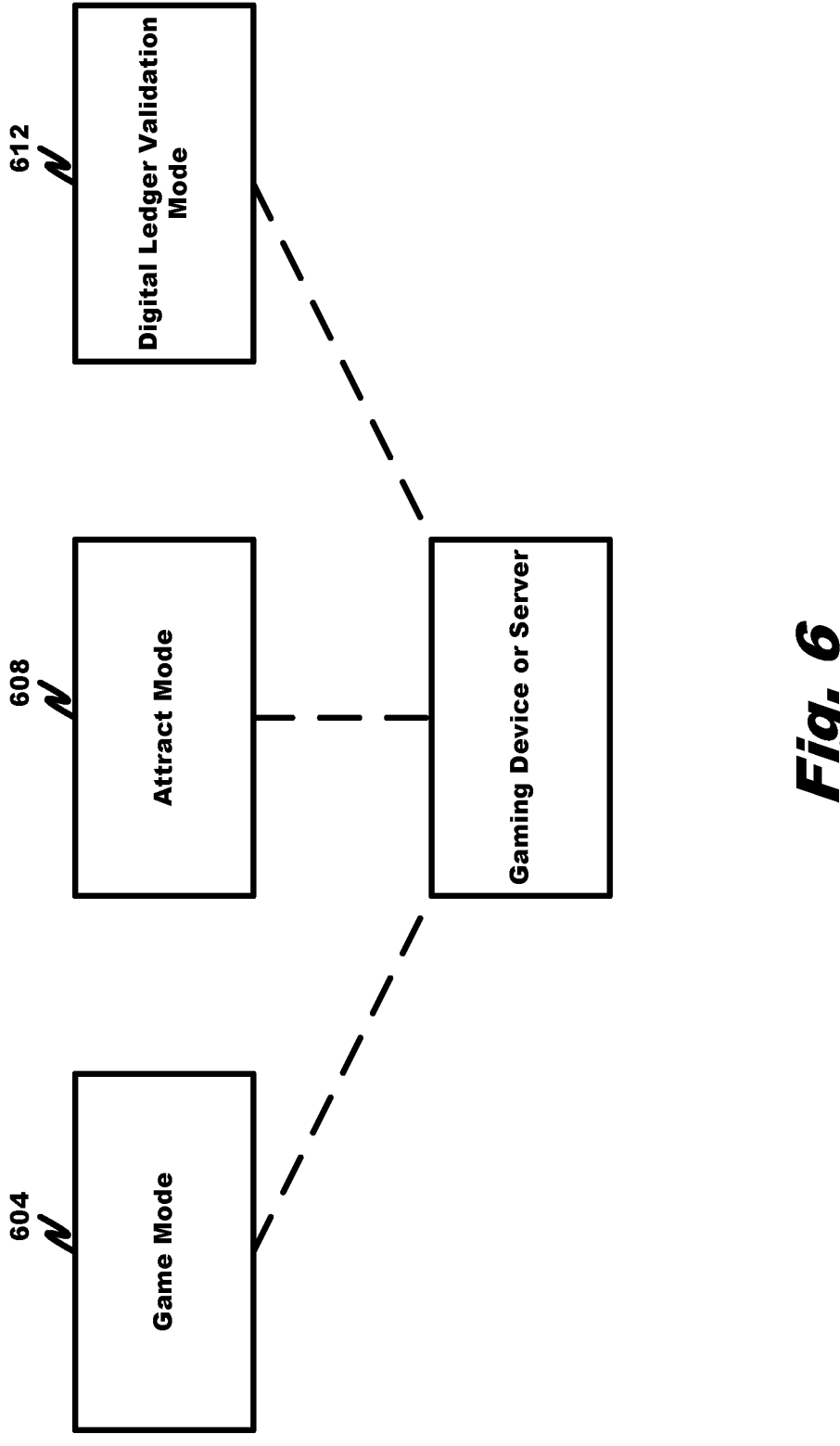
FIG. 6 is a block diagram depicting the various operating modes of a gaming device in accordance with embodiments of the present disclosure.

With reference to FIG. 6, each of the gaming devices 112 independently or based on input from the gaming server 116 operate in one of a game mode 604, attract mode 608, or digital ledger validation mode 612.

In some embodiments, the game mode 604, when executed by the processor 204, enables the gaming device 112 to play a game with a player actively interacting with the gaming device 112. The game can be a game of chance, skill, or a combination thereof.

In some embodiments, the attract mode 608, when executed by the processor 204, enables the gaming device 112 to display information designed to attract a player 124. In the attract mode 608, the player 124 is not interacting with the gaming device 112 but the display devices 270 display a looping gameplay demonstration to attract players. The attract mode is typically triggered by allowing the game to remain a looping gameplay demonstration to attract players. The attract mode is typically triggered by allowing the game to remain on the user interface for an extended period of time. The gaming system can play a short demonstration video to give players an idea of how the game is played and/or display a high score table before returning to the original display. Some gaming systems can provide multiple demonstration videos that are looped through in sequence if the gaming system is left idle.

In some embodiments, the digital ledger validation mode 612, when executed by the processor 204, enables the gaming device 112 to validate transaction data in a digital ledger record against a set of validation rules or criteria, when the transaction data is successfully validated, execute a hashing algorithm to generate a hash of the transaction data and the hash of the second record in the digital ledger, and save the generated hash in a header of the selected record in the digital ledger. Multiple different validation mode instruction sets, each comprising a set of validation rules, can be stored in memory 208 to validate multiple different types of digital ledgers. By way of example, each validation mode instruction set corresponds to a particular type of crypto-currency.

In some embodiments, the processor 204 of the gaming device 112 determines that the gaming system is free of player 124 interaction for a determined period of time, in response cause the gaming device 112 to operate in the digital ledger validation mode to validate a selected record of a digital ledger 188, receive input that the gaming device 112 has interacted with a potential player 124 while oper- ating in the digital ledger validation mode, and, in response, cause the gaming system to operate in the game mode 604 to play a game session with the player 124. Player 124 interaction can be deemed to have occurred when the player 124 contacts physically the gaming system, the player 124, though not in physical contact with the gaming system, is determined by one or more cameras, motion sensors, micro- phones, or proximity sensors (such as ultrasonic, capacitive, photoelectric, inductive, or magnetic sensors), to be in spatial proximity to the gaming device 112, and a player credit has been generated by or is otherwise stored in the wager credit meter 210.

The game, attract, and digital ledger validation modes 604, 608, and 612 are commonly temporally discrete from one another and provide, via the display devices 270 dif- ferent displayed information to the player 124. In the game mode 604, the player 124 interacts actively with the gaming device 112 to play a game session, causing the display devices 270 to provide game information to the player 124. In the attract mode 608, the player 124 does not interact with the gaming device 112 but the display devices 270 provide predetermined information to attract players 124. The attract mode 608 is typically triggered by allowing the game to remain on the display devices 270 for an extended period of time. In the digital ledger validation mode 612, the player 124 does not interact with the gaming device 112 and the display devices 270 can provide the same of different information relative to that information provided in the attract mode 608. The displayed information can be designed to deter players from selecting the gaming system, such as by displaying an out of service message or a blank screen, encourage players to play a game with the gaming device 112 such as by displaying a banner on the display devices 270 that the gaming device 112 is currently involved in cryptocurrency mining (or digital ledger validation) (FIG. 7), or to encourage a player 124 to place a side bet wager on an ability of the gaming device 112 to successfully validate the digital ledger 188.

Figure 7:
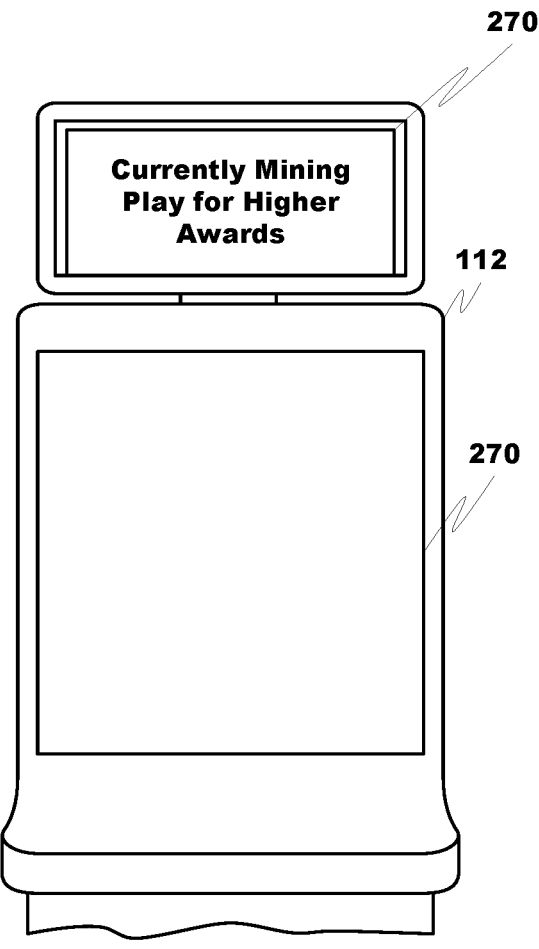
FIG. 7 depicts signage displayed by a gaming device in accordance with embodiments of the present disclosure.

Referring to FIG. 7, in addition to displaying a banner on the display devices 270 that the gaming device 112 is currently involved in cryptocurrency mining, a display device 270 can also display current mining statistics for one or more digital ledger blocks. The mining can show how long since a gaming device in a particular subset of gaming devices won a jackpot associated with the subset or con- nected subsets from mining the winning block or when a gaming device in a selected subset last successfully mined a block. The displayed statistics can include averages (e.g., a block is mined every 35 days) and how "overdue" the selected subset might be for computing the winning block on the blockchain. This may help drive play on blockchain connected, or associated gaming devices. It may also help drive bets on blockchain activity (when the next block will be mined), as noted above.

In some embodiments, the attract and digital ledger vali- dation modes 808 and 812 are combined and implemented as only one mode. This combined mode is commonly implemented when the amount of computational work to exit the combined mode to the game mode 804 will not cause a noticeable delay to the player 124 in transitioning the user interface-provided information to gaming information. The combined mode is generally employed when the block time is relatively short and separate attract and digital ledger validation modes 808 and 812, respectively, when the block time is longer.

Figure 4:
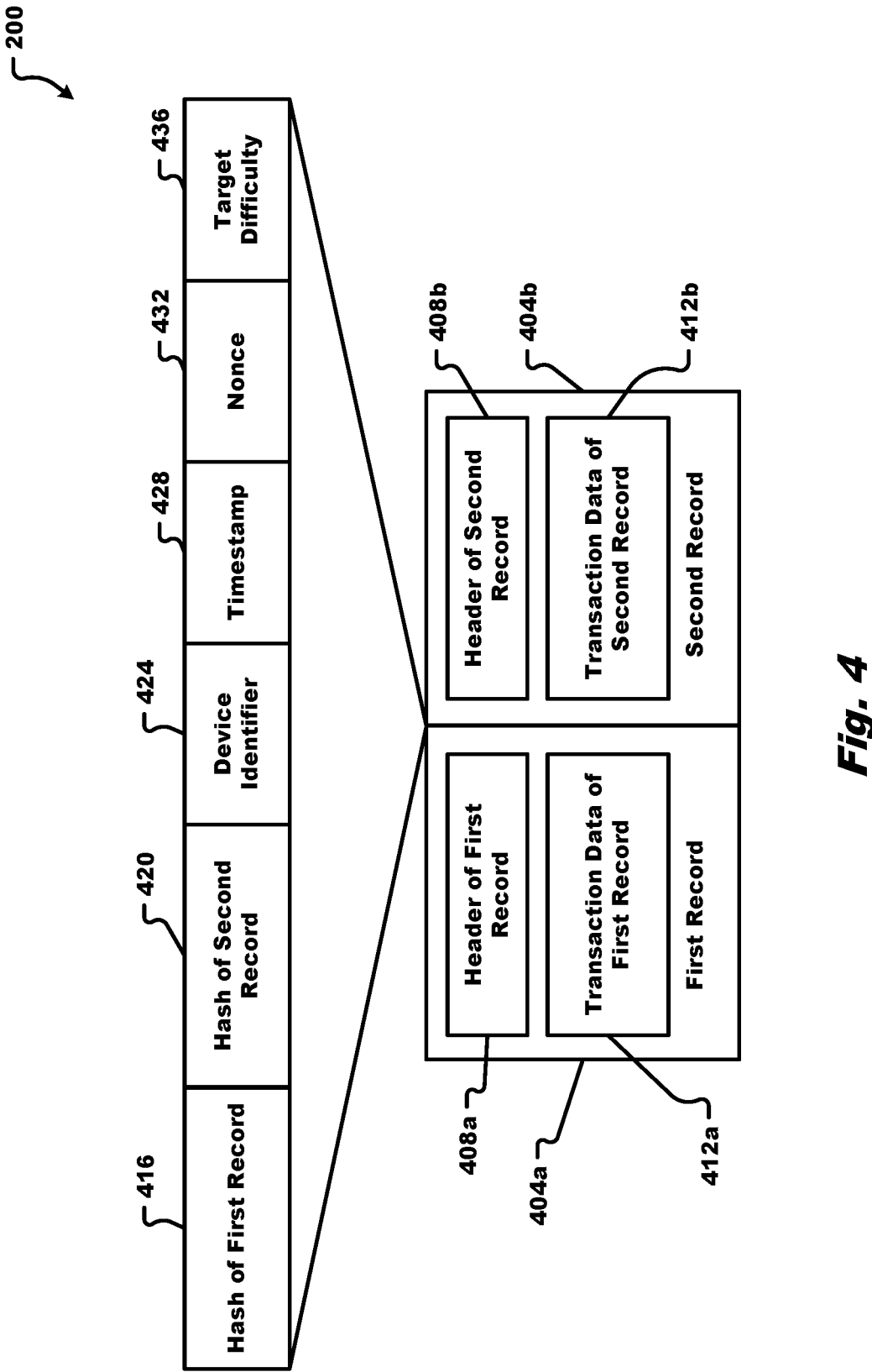
FIG. 4 is a block diagram depicting a gaming device in accordance with embodiments of the present disclosure.

With reference now to FIG. 4, additional details of the digital ledger will be described in accordance with at least some embodiments of the present disclosure. First and second records 404a and b of a digital ledger 400 are depicted. Each record comprises a header 408a and b and transaction data 412a and b. The header 408b of the second record 404b can comprise a hash 416 of the first record 416, a hash 420 of the second record 420, a device identifier 424 of a computational device, such as the gaming device 112 or gaming server 112, adding the second record 404b to the digital ledger 188, a timestamp 428, a nonce 432, and a target difficulty 436. The hashes of the first and second records 416 and 420 are generated using a selected hashing algorithm 222. The device identifier 424 can be any unique device identifier, such as a serial number, TCP/IP address, MAC address, or other electronic address of the computa- tional device on the communication network 108. The timestamp 428 is the timestamp when the respective second record was hashed. The target difficulty 436 adjusts up or down depending on how quickly records are added to digital ledgers by the first, second, . . . nth gaming devices 112a, b, . . . and 112l, m, . . . and the gaming server 116 of the digital ledger validation network 100. In many embodiments, the digital ledger validation network 100 must first win a competition with other third party computational devices in other mining pools to find the correct hash that solves a difficult math problem. For example, the gaming devices 112 of the digital ledger validation network 100 can win the competition if it is the first to produce a hash from the selected record with a certain number of leading zeros. The target difficulty can be adjusted after a determined number of records are added by the community of computational devices, with the adjustment being based in some embodi- ments on how long it took to solve mathematical problems presented in the records. The nonce 432 can be a number added to each record and is the variable that the digital ledger validation network 100 or third party computational devices in other mining pools can continuously change until it finds a nonce that solves the math problem. Stated differently, the digital ledger validation network 100 or third party computational devices can continuously change the nonce until the hashing algorithm results in a hash with a certain number of leading zeros. When the digital ledger validation network 100 or third party computational devices broadcast the record to the network 108, the other compu- tational devices can use the nonce 432 in a selected record 408 and hash the transaction data 404 in the corresponding record and determine whether or not the nonce produces a hash with the correct number of leading zeros.

The transaction data 412 can be a list of transactions. In some embodiments, the transactions in the record are con- tained in a Merkle tree or binary hash tree structure. Each transaction can be defined by an interaction between two nodes of the network 108. For example, the transaction data 412 can be a list of cryptocurrency transactions in which a user signs off on a transaction from his or her wallet application and causes a crypto or token to be sent to another party's network node. The transaction data can be anonymous by listing specific cryptocurrency addresses rather than a personal name or electronic address of either the user or the party.

Figure 5:
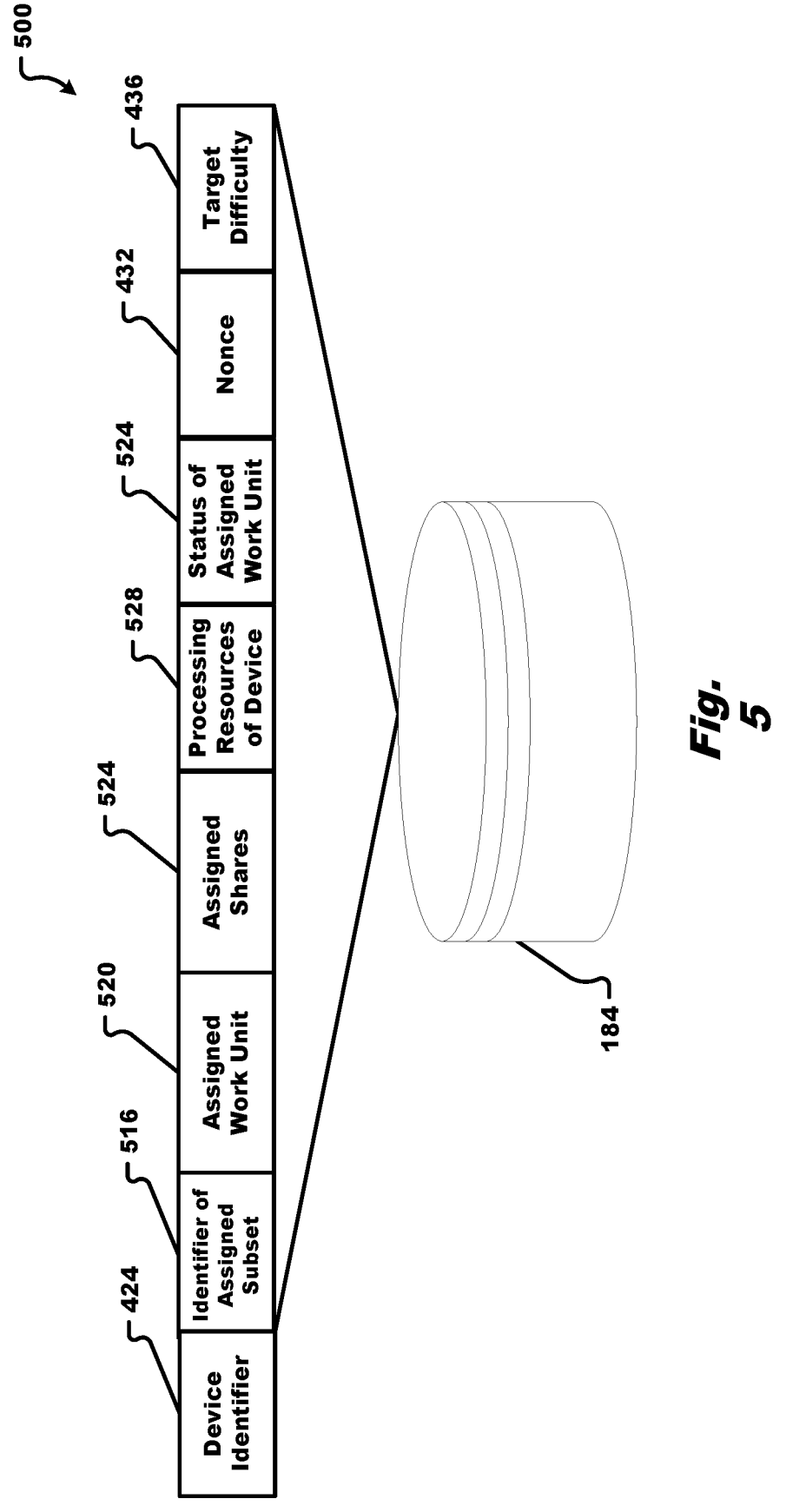
FIG. 5 is an illustrative data structure used in a validated record of a digital ledger in accordance with embodiments of the present disclosure.

With reference now to FIG. 5, additional details of the database 184 will be described in accordance with at least some embodiments of the present disclosure. The database 184 comprises data structures 500 that enable the gaming server 116 to control the digital ledger validation operations of the digital ledger validation network 100. The data structures comprise a device identifier 424 of the corresponding gaming device 112 in the digital ledger validation network 100, an identifier 516 of a gaming device subset to which the corresponding gaming device 112 is assigned, an assigned work unit 520 assigned by the gaming server 116 to the corresponding gaming device 112, a number of shares assigned by the gaming server 116 to the corresponding gaming device 112, a description of the processing resources 528 of the corresponding gaming device 112 (e.g., central processing units (CPUs), graphics processing units (GPUs), etc.), a status of the assigned work unit 524 (e.g., pending, completed, etc.), a nonce 432 (if any) discovered corresponding to the predetermined criteria for successful digital ledger validation, and a target difficulty 436 associated with the digital ledger validation.

With reference now to FIG. 8, a method of operating in the digital ledger validation mode 612 will be described in accordance with embodiments of the present disclosure.

The method begins with the selection by the gaming server 116 in step 804 of a gaming device 112 of a plurality of gaming devices to enter into the digital ledger validation mode 612.

The method may continue by the gaming server 116 in step 808 determining that the selected gaming device 112 is eligible to enter the digital ledger validation mode and assigning the gaming device to a given subset of gaming devices (if not already assigned to a subset). Eligibility can be based on a number of criteria, including an operational status of the gaming device (whether online or offline), an operating mode of the gaming device (e.g., whether a current operating mode is the attract, game or digital ledger validation mode), the processing capabilities of the gaming device, and other factors appreciated by those of skill in the art. The subset of gaming devices can be selected based on many factors including the processing capabilities of the selected gaming device relative to the other gaming devices in the subset, the spatial location of the selected gaming device relative to the other gaming devices in the subset, the type of game played by the selected gaming device in the game mode relative to the other gaming devices in the subset, a current operating mode of the selected gaming device, a game theme associated with the selected gaming device relative to a game theme of the other gaming devices in the subset, a player denomination associated with the selected gaming device, a total player play associated with the selected gaming device, a player maximum bet associated with the selected gaming device, an associated player account status, a player decision associated with the selected gaming device, an associated player achievement, a bonus trigger associated with the selected gaming device, a computational resource capacity of the selected gaming device, an operating cost of the selected gaming device, and/or a game event associated with the selected gaming device.

The method can continue by the gaming server 116 configuring a work unit to be performed comprising a selected validation mode instruction set, a selected hashing algorithm 222, and a range of nonce values (step 812).

The method can continue by the gaming server 116 assigning, by a work unit message transmitted to the selected gaming device 112 and comprising the work unit, the work unit to the selected gaming device (step 816).

The method can continue by the gaming server 116 commanding the selected gaming device to enter the digital ledger validation mode in accordance with the assigned work unit (step 820).

The method can continue by the gaming server 116 commanding the selected gaming device to enter the digital ledger validation mode in accordance with the assigned work unit (step 820).

The method can continue by the gaming server 116 monitoring the gaming device, an electronic address, and/or the digital ledger for a successful solution and determining, on an ongoing basis, the work performed by each gaming device and each gaming device subset in connection with validating the digital ledger (step 824).

The method can continue by the gaming server 116 determining whether or not a cryptocurrency reward has been detected (step 828). When no cryptocurrency reward is detected, the gaming server 116 returns to and repeats step 824.

When a cryptocurrency reward is detected, the gaming server 116 increments a central validation reward meter by the reward and allocates the reward amongst the sets of gaming devices as set forth above (step 832).

When the allocation is determined by the gaming server 116, the gaming server 116 decrements the central validation reward meter and increments the progressive pool meters for each of the gaming device subsets to reflect the reward, and determines the terms of the progressive reward (step 836).

In some embodiments the gaming server 116 weights the computational contributions (of each subset of gaming devices) and allocates the reward accordingly. For example, one casino might have 1000 EGMs while another might have 100 EGMs, and the gaming server can weight the reward distribution algorithm accordingly. The system could also award the prize to multiple gaming device subsets but distribute the award based solely on computational resources contributed to the successful digital ledger validation.

In one embodiment the gaming server 116 distributes the cryptocurrency reward across many progressive pools. For example, a gaming device 112 or other mining device in a first subset of gaming devices, might mine $350,000 worth of Bitcoin. As a result, the gaming server 116 might add $1,000 to 350 poker royal flush progressives across progressive pools for multiple gaming device subsets including the first subset.

In another embodiment, the gaming server can use a random number value from the RNG/PRNG 348 to randomly select a gaming device subset, with each gaming device subset corresponding to a range of potential random number values against which the random number value is mapped.

The reward can be added to an existing award of a gaming device. For example, the cryptocurrency reward can be added to the progressive award or standard paytable award of a game. For the progressive pool example, successful mining would add the mining reward to one or more progressive pools such that the mining efforts increase the progressive pool wins amount along with the game play that is also increasing those amounts. The reward amount could be added to the existing prize pools as a cash conversion amount (after taking into account one or more cryptocurrency to cash conversion fees), or as a secondary amount denominated in the appropriate cryptocurrency type.

In some embodiments the winning EGM/player is determined by taking into consideration the game type, the game theme, player denomination, total player play, player maximum bet, player account status, player decisions, player achievements, bonus triggers, game events, etc. For example, the host system might decide to award to a poker machine and therefore randomly choose an EGM that is currently playing a poker theme (and optionally apply other selection criteria within the remaining set of eligible EGMs).

Figure 9:
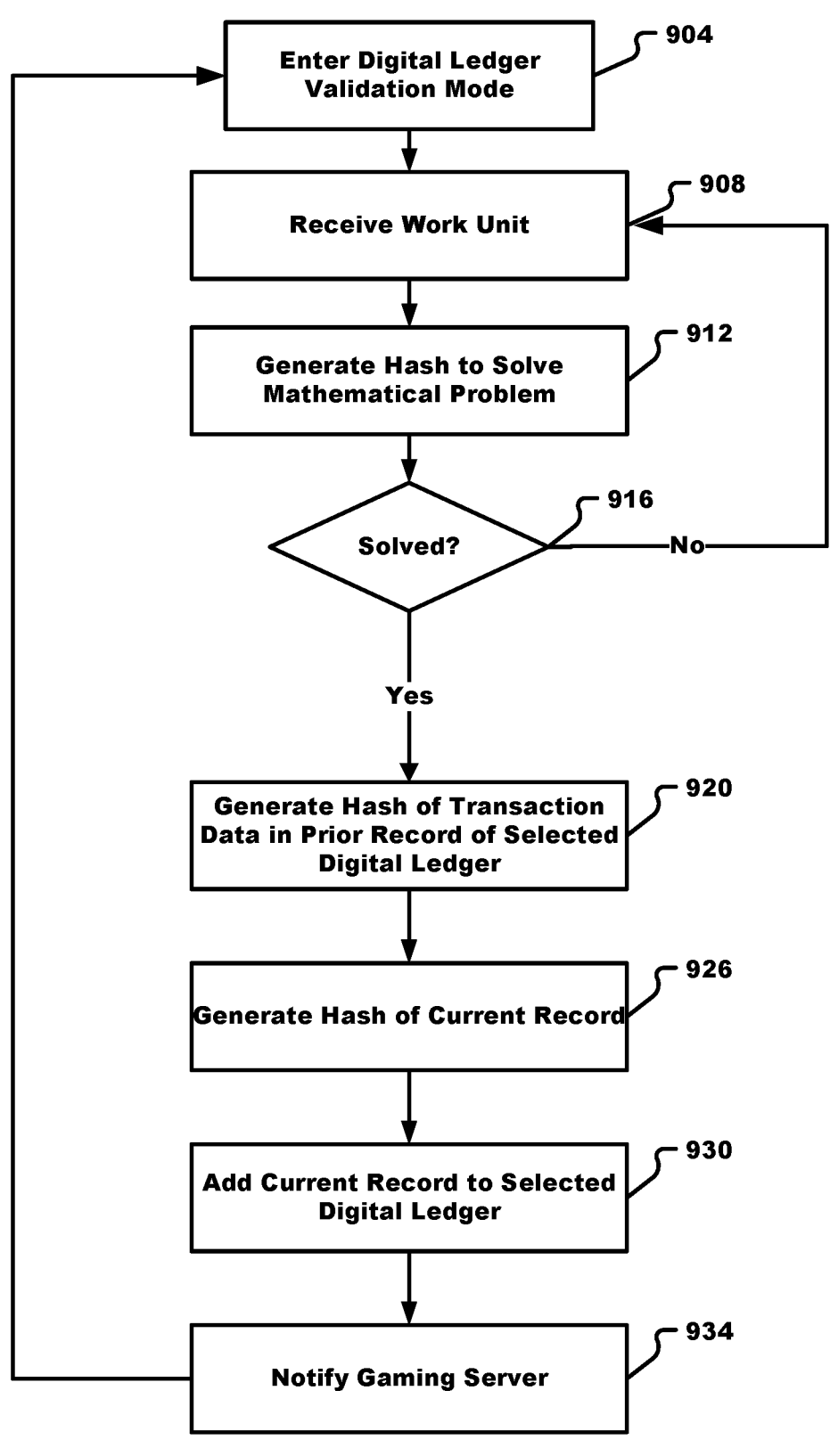
FIG. 9 is a flow diagram depicting a method of awarding a progressive pool in accordance with embodiments of the present disclosure.

With reference now to FIG. 9, a method of operating in the digital ledger validation mode 612 will be described in accordance with embodiments of the present disclosure.

The method begins with the determination in step 904 that the gaming device 112 can enter into the digital ledger validation mode 612.

The method continues by the gaming server 116 assigning to the gaming device 112 a work unit for processing.

The method may continue by the gaming device 112 selecting a nonce and generating a hash to solve a mathematical problem associated with the selected digital ledger 188 (step 912).

In query 916, the gaming device 112 or gaming server 116 determines whether the mathematical problem has already been solved by another computational device. If the query 916 is answered negatively, the gaming device 112 or gaming server 116 returns to step 908 and selects a next digital ledger 188 to be validated. If the query is answered positively, the gaming device 112 or gaming server 116 generates a hash of the transaction data in a prior record of the selected digital ledger (step 920).

The method continues in step 926 by the gaming device 112 generating a hash of the current record.

The method continues in step 930 by the gaming device 112 adding the current record to the selected digital ledger.

The method continues in step 934 by the gaming server 116 incrementing the validation reward meter 230 by the reward for validating successfully the selected digital ledger.

Figure 10:
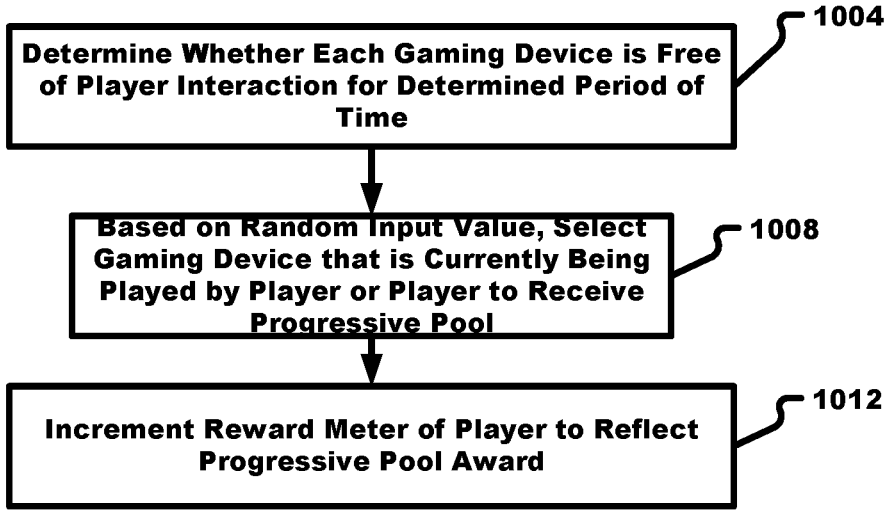
FIG. 10 is a flow diagram depicting a server-controlled method of allocating cryptocurrency rewards in accordance with embodiments of the present disclosure.

With reference now to FIG. 10, a method of awarding a progressive pool will be described in accordance with embodiments of the present disclosure.

The method begins with the determination by the gaming server 116 in step 904 whether each gaming device 112 is free of player interaction for a determined period of time (step 1004). The determination is typically based on input from each gaming device 112 and the player tracking sensor(s) 192.

The method can continue by the gaming server 116 selecting a gaming device 112 that is currently being played by a player 124 or player to receive the progressive pool award (step 1008). The factors used in selecting the gaming device typically require generation of a random number value by the RNG/PRNG 348.

In some embodiments when a gaming device 112 or associated gaming device subset wins a cryptocurrency reward, the gaming server 116 is notified and then randomly picks one or more gaming devices 112 across the various gaming device subsets that is currently being played by a player 124 and distributes the reward as an award to those players 124. In other embodiments, the gaming server 116 randomly chooses the player first and then determines which gaming device or subset of gaming devices that the selected player is playing. In some embodiments, the award goes to the player at the gaming device 112 that successfully mined the block on the blockchain. In another similar embodiment, the player at the gaming device that successfully mined the block on the blockchain receives a larger portion of the prize which is split across multiple winning players and/or gaming devices. In some embodiments, the player 124 is recognized for the achievement. For example, to celebrate the award, the player's gaming device 112 may animate, the display devices of the gaming device and other signs show the name and amount of the win, or some other promotion is made to identify the awarded gaming device location, awarded player, and/or amount and/or cryptocurrency type ("ex: Big 1 Win"). In some embodiments a portion of the cryptocurrency mining award is reserved for the operator of the gaming device 112, the operator mining host, or the operator of the casino associated with the winning subset of gaming devices 112. This covers the costs of operating the gaming devices and other processing equipment used in the mining operation.

The method can continue by the gaming server 116 incrementing the reward meter of the player to reflect the progressive pool award (step 1012).

The award is likely given in the current currency (such as dollars) or potentially the player could be awarded cryptocurrency as a handpay (using a process similar to how a player wins a physical progressive award today, such as when they win a car). The first method is simpler but awarding cryptocurrency can reinforce the association with the popular cryptocurrency trend. To award cryptocurrency, the player has a wallet associated with their player account having separate cash and cryptocurrency wallets, such as in the resort wallet 352, or the player is allowed to present a stand-alone crypto address and/or wallet top receive the cryptocurrency. For example, the selected gaming device 112 could display a message that the player has won and enter the address or other credentials for the player's cryptocurrency wallet. In another embodiment, a casino attendant could go to the player 124 and perform a similar transaction, such as scanning the quick response (QR) code on the player's personal communication device (e.g., smart phone) that represents the players crypto wallet address or crypto address. This can occur during the handpay process. In another embodiment, the award could be paid to the player's resort wallet account, which, as stated, holds a cryptocurrency wallet balance that is separate and distinct from the player's other credit types.

In some embodiments, triggering of the bonus award on the gaming device is achieved through legacy protocols, such as SAS and G2S, by awarding a bonus or transferring credits to the player. Using the legacy protocols would require that the host first convert the awarded cryptocurrency to cash as the legacy protocols do not have crypto currency transfer functions. Legacy protocols may also be used to put the EGM into a handpay state, requiring casino staff members to come out and coordinate with the player the payment of their cryptocurrency award. In other embodiments, the player's cryptocurrency award could be deposited into the player's resort wallet account, which may maintain one or more cryptocurrency wallets on their behalf.

In some embodiments, mining bets could go into a pool, and the players who win mining prediction bets could get a portion of that pool value (after a fee or vig is given to the casino).

In another embodiment, mining bets could be placed only in cryptocurrency, and the gaming system can follow any of the models mentioned above.

It should be appreciated that a single company or casino can implement the concepts of this disclosure. For example, a casino could purchase Bitcoin ASIC miners and use the mining awards gained from the devices to fund progressives, bonuses, lucky coin awards, and mystery progressives for their operations.

It should be appreciated that the various methods and systems described herein may be attractive to casinos because the bonus aggregation can be used to increase player loyalty by providing players with an opportunity to win larger awards based on the player's bonus award history. The methods and systems disclosed herein are attractive to players because the players are given more and different opportunities to win aggregated bonuses of various sizes, which may depend upon probabilities of events occurring within a gaming system or game of chance.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method for digital ledger validation in a gaming system, comprising:

assigning, by a processor, to each gaming device in first and second subgroups of a plurality of gaming devices operating in a digital ledger validation mode to validate a set of data records representing a digital ledger, a corresponding set of work units to use in determining a solution to a digital ledger problem, the solution being defined by predetermined criteria;

storing, by the processor, the set of work units assigned to each gaming device in the first and second subgroups in a computer readable memory;

receiving, by the processor, a notification that a first gaming device in the first subgroup of the plurality of gaming devices has found the solution satisfying the predetermined criteria and that the gaming device has been awarded a cryptocurrency block and corresponding cryptocurrency award;

storing, by the processor, in a set of data structures an identity of the first gaming device and corresponding cryptocurrency award in the computer readable memory;

generating, by a pseudorandom or random number generator, a random input value;

storing, by the processor, the random input value in the set of data structures in the computer readable memory;

selecting, by the processor based at least in part on the random input value, a gaming device from among the plurality of gaming devices to receive at least a portion of the cryptocurrency award; and updating, by the processor, the set of data structures to associate the at least a portion of the cryptocurrency award with the identity of the selected gaming device.

2. The method of claim 1, wherein the first gaming device in the first subgroup of the plurality of gaming devices is operating in one of a gaming mode and attract mode while operating in the digital ledger validation mode, wherein a membership size of the corresponding set of work units depends on whether a respective gaming device is operating in the gaming mode or attract mode, and further comprising:

determining, by the processor, relative computational contributions of the plurality of gaming devices in the first and second subgroups of the plurality of gaming devices toward a respective work unit;

allocating, based on the relative computational contributions, the cryptocurrency award between the first and second subgroups of the plurality of gaming devices; and selecting a player from among multiple players of the plurality of gaming devices to receive the at least a portion of the cryptocurrency reward; and updating, by the processor, a set of data structures associated with an account of the selected player to reflect the at least a portion of the cryptocurrency reward.

3. The method of claim 2, wherein the predetermined criteria comprise a hash value being less than or equal to a target hash value and further comprising:

updating, by the processor, a set of data structures associated with a progressive pool to reflect the at least a portion of the cryptocurrency reward, wherein the set of data structures tracks an amount of cryptocurrency and non-cryptocurrency in the progressive pool, the non-cryptocurrency being from prior gaming events on the first subgroup of the plurality of gaming devices, and wherein, in the updating of the set of data structures associated with an account of the selected player, the set of data structures comprises a cash balance of the account of the selected player and a cryptocurrency balance of the selected player account, the cash balance being independent and different from the cryptocurrency balance.

4. The method of claim 1, wherein the first and second subgroups of the plurality of gaming devices are selected to operate in the digital ledger validation mode based on one of an operating mode of a given gaming device, a game type associated with the given gaming device, a game theme associated with the given gaming device, a player denomination associated with the given gaming device, a total player play associated with the given gaming device, a player maximum bet associated with the given gaming device, an associated player account status, a player decision associated with the given gaming device, an associated player achievement, a bonus trigger associated with the given gaming device, a processing power of the given gaming device, an operating cost of the given gaming device, and a game event associated with the given gaming device, and further comprising:

validating, by the processor, a selected transaction data in the digital ledger against a set of validation rules comprising the predetermined criteria;

when the selected transaction data is successfully validated, executing, by the processor, a hashing algorithm to generate a hash of the selected transaction data and a hash of a second record in the digital ledger; and saving, by the processor, the generated hash in a header of a selected record in the digital ledger, wherein, after successful validation, the selected record in the digital ledger comprises (a) the header comprising the generated hash, the hash of the second record in the digital ledger, a nonce, a target difficulty, a device identifier associated with the corresponding first or second subgroup of the plurality of gaming devices, and a timestamp of when the selected record in the digital ledger was hashed and (b) the selected transaction data.

5. The method of claim 1, wherein a game session on the gaming device being played by a selected player during the selecting has a random or pseudorandom outcome, and further comprising:

updating, by the processor, the set of data structures associated with a central account to reflect the at least a portion of the cryptocurrency reward, wherein the set of data structures tracks an amount of cryptocurrency;

updating, by the processor, a set of data structures associated with a progressive jackpot meter to reflect transfer of the at least a portion of the cryptocurrency reward;

updating, by the processor, the set of data structures associated with the central account to reflect the transfer of the at least a portion of the cryptocurrency reward to the progressive jackpot meter; and causing, by the processor, the digital ledger to be updated to reflect transfer of the at least a portion of the cryptocurrency reward to an electronic address associated with a cryptocurrency wallet of a selected player playing the selected gaming device, the cryptocurrency wallet comprising one of public and private keys and a seed that can be used to receive and spend cryptocurrency.

6. The method of claim 1, wherein the set of work units comprises a range of nonce values, wherein the predetermined criteria comprise a hash value being less than or equal to a target hash value and wherein a hashing algorithm used in generating the hash value is a proof-of-stake scheme and further comprising:

allocating the cryptocurrency award between the first and second subgroups of the plurality of gaming devices, wherein the allocating is based on a respective share assigned to each of the first and second subgroups of the plurality of gaming devices, the respective share being assigned based on a relative contribution of the first and second subgroups of the plurality of gaming devices towards generating the hash value that is less than or equal to a target hash value, and wherein the target hash value sets a difficulty level for determining whether the hash value that is less than or equal to the target hash value, and wherein the respective share is assigned based on one of receipt of an acceptable proof-of-work and proof of activity and further comprising:

conditioning, by the processor, selection of the gaming device to receive the at least a portion of the cryptocurrency reward based on a selected player being in spatial proximity to the selected gaming device.

7. The method of claim 6, wherein the pseudorandom or random number generator selects a gaming event first satisfied by a selected player, the gaming event comprising one of a time of day, a number of game spins, an award amount, a wager amount, and a game event and further comprising:

tracking play activity at each of the plurality of gaming devices, wherein the tracking of play activity tracks one of physical contact of an input of each gaming device by an associated player, a credit balance associated with each gaming device, and a temporally recent operating mode of each gaming device, wherein each gaming device operates discretely in different operating modes comprising the digital ledger validation mode, a gaming mode in which a different player is involved in a gaming session on each gaming device, and in an attract mode that is free of player interaction;

determining, by the processor, that the selected gaming device in the first subgroup of the plurality of gaming devices that generated the hash value is not currently being played;

in response to determining that the selected gaming device in the first subgroup of the plurality of gaming devices that generated the hash value is not currently being played, determining which of the plurality of gaming devices are currently being played, wherein the selected player is currently playing at a different gaming device in the first subgroup of the plurality of gaming devices; and selecting the different gaming device to receive the at least a portion of the cryptocurrency reward.

8. The method of claim 1, wherein a hashing algorithm used by each gaming device in the first and second subgroups of the plurality of gaming devices to validate the set of data records representing the digital ledger is a combined proof-of-work and proof-of-stake scheme, wherein the plurality of gaming devices comprise one of an electronic gaming machine (EGM) and electronic gaming table (EGT), wherein the digital ledger is an open distributed ledger, and wherein a selected record in the digital ledger comprises transaction data and a second hash of a second record in the digital ledger and further comprising:

displaying by the gaming device a notification that the gaming device in the corresponding first or second subgroup of the plurality of gaming devices is one of operating in the digital ledger validation mode and a cryptocurrency balance of a progressive jackpot associated with the gaming device;

receiving, by the processor, a side wager on which of the first and second subgroups of the plurality of gaming devices will be first to generate a hash value that is less than or equal to a target hash value; and when the gaming device in the first subgroup of the plurality of gaming devices that generated the hash value is currently being played by a player, selecting the player from among multiple players of the plurality of gaming devices to receive at least a portion of the cryptocurrency reward.

9. A gaming server comprising:

a communications interface to receive and send communications over a network;

a processor coupled with the communications interface; and a memory coupled with and readable by the processor and storing therein a set of instructions which, when executed by the processor causes the processor to:

assign to each gaming device in first and second subgroups of a plurality of gaming devices operating in a digital ledger validation mode to validate a set of data records representing a digital ledger, a corresponding set of work units to use in determining a solution to a digital ledger problem, the solution being defined by predetermined criteria;

store the set of work units assigned to each gaming device in the first and second subgroups of the plurality of gaming devices in the memory;

receive a notification that a first gaming device in the first subgroup of the plurality of gaming devices has found the solution satisfying the predetermined criteria and that the gaming device has been awarded a cryptocurrency block and corresponding cryptocurrency award;

store in a set of data structures an identity of the first gaming device and corresponding cryptocurrency award in the memory;

generate, by a pseudorandom or random number generator, a random input value;

store the random input value in the set of data structures in the memory;

select, based at least in part on the random input value, a gaming device from among the plurality of gaming devices to receive at least a portion of the cryptocurrency award; and update the set of data structures to associate the at least a portion of the cryptocurrency award with the identity of the selected gaming device.

10. The gaming server of claim 9, wherein the first gaming device in the first subgroup of the plurality of gaming devices concurrently operates in one of a gaming mode and attract mode while operating in the digital ledger validation mode, wherein a membership size of the corresponding set of work units depends on whether a respective gaming device is operating in the gaming mode or attract mode, and wherein the instructions, when executed by the processor, further cause the processor to:

determine relative computational contributions of the plurality of gaming devices in the first and second subgroups of the plurality of gaming devices toward a respective work unit;

allocate, based on the relative computational contributions, the cryptocurrency award between the first and second subgroups of the plurality of gaming devices; and select a player from among multiple players of the plurality of gaming devices to receive the at least a portion of the cryptocurrency reward; and update a set of data structures associated with an account of the selected player to reflect the at least a portion of the cryptocurrency reward.

11. The gaming server of claim 10, wherein the predetermined criteria comprise a hash value being less than or equal to a target hash value and wherein the instructions, when executed by the processor, further cause the processor to:

update a set of data structures associated with a progressive pool to reflect the at least a portion of the cryptocurrency reward, wherein the set of data structures tracks an amount of cryptocurrency and non-cryptocurrency in the progressive pool, the non-cryptocurrency being from prior gaming events on the first subgroup of the plurality of gaming devices, and wherein, in the updating of the set of data structures associated with an account of the selected player, the set of data structures comprises a cash balance of the account of the selected player and a cryptocurrency balance of the selected player account, the cash balance being independent and different from the cryptocurrency balance.

12. The gaming server of claim 9, wherein the first and second subgroups of the plurality of gaming devices are selected to operate in the digital ledger validation mode based on one of an operating mode of a given gaming device, a game type associated with the given gaming device, a game theme associated with the given gaming device, a player denomination associated with the given gaming device, a total player play associated with the given gaming device, a player maximum bet associated with the given gaming device, an associated player account status, a player decision associated with the given gaming device, an associated player achievement, a bonus trigger associated with the given gaming device, a processing power of the given gaming device, an operating cost of the given gaming device, and a game event associated with the given gaming device, and wherein the instructions, when executed by the processor, further cause the processor to:

validate a selected transaction data in the digital ledger against a set of validation rules comprising the predetermined criteria;

when the selected transaction data is successfully validated, executing, by the processor, a hashing algorithm to generate a hash of the selected transaction data and a hash of a second record in the digital ledger; and saving, by the processor, the generated hash in a header of a selected record in the digital ledger, wherein, after successful validation, the selected record in the digital ledger comprises (a) the header comprising the generated hash, the hash of the second record in the digital ledger, a nonce, a target difficulty, a device identifier associated with the corresponding first or second subgroup of the plurality of gaming devices, and a timestamp of when the selected record in the digital ledger was hashed and (b) the selected transaction data.

13. The gaming server of claim 9, wherein a game session on the gaming device being played by a selected player during the selecting has a random or pseudorandom outcome and wherein the instructions, when executed by the processor, further cause the processor to:

updates the set of data structures associated with a central account to reflect the at least a portion of the cryptocurrency reward, wherein the set of data structures tracks an amount of cryptocurrency;

updates a set of data structures associated with a progressive jackpot meter to reflect transfer of the at least a portion of the cryptocurrency reward;

updates the set of data structures associated with the central account to reflect the transfer of the at least a portion of the cryptocurrency reward to the progressive jackpot meter; and causes the digital ledger to be updated to reflect transfer of the at least a portion of the cryptocurrency reward to an electronic address associated with a cryptocurrency wallet of a selected player playing the selected gaming device, the cryptocurrency wallet comprising one of public and private keys and a seed that can be used to receive and spend cryptocurrency.

14. The gaming server of claim 9, wherein the set of work units comprises a range of nonce values, wherein the predetermined criteria comprise a hash value being less than or equal to a target hash value and wherein a hashing algorithm used in generating the hash value is a proof-of-stake scheme and wherein the instructions, when executed by the processor, further cause the processor to:

allocate the cryptocurrency award between the first and second subgroups of the plurality of gaming devices, wherein the allocating is based on a respective share assigned to each of the first and second subgroups of the plurality of gaming devices, the respective share being assigned based on a relative contribution of the first and second subgroups of the plurality of gaming devices towards generating the hash value that is less than or equal to a target hash value, and wherein the target hash value sets a difficulty level for determining whether the hash value that is less than or equal to the target hash value, and wherein the respective share is assigned based on one of receipt of an acceptable proof-of-work and proof of activity and further comprising:

condition selection of the gaming device to receive the at least a portion of the cryptocurrency reward based on a selected player being in spatial proximity to the selected gaming device.

15. The gaming server of claim 14, wherein the pseudorandom or random number generator selects a gaming event first satisfied by a selected player, the gaming event comprising one of a time of day, a number of game spins, an award amount, a wager amount, and a game event and wherein the instructions, when executed by the processor, further cause the processor to:

track play activity at each of the plurality of gaming devices, wherein the tracking of play activity tracks one of physical contact of an input of each gaming device by an associated player, a credit balance associated with each gaming device, and a temporally recent operating mode of each gaming device, wherein each gaming device operates discretely in different operating modes comprising the digital ledger validation mode, a gaming mode in which a different player is involved in a gaming session on each gaming device, and in an attract mode that is free of player interaction;

determine that the selected gaming device in the first subgroup of the plurality of gaming devices that generated the hash value is not currently being played;

in response to determining that the selected gaming device in the first subgroup of the plurality of gaming devices that generated the hash value is not currently being played, determine which of the plurality of gaming devices are currently being played, wherein the selected player is currently playing at a different gaming device in the first subgroup of the plurality of gaming devices; and select the different gaming device to receive the at least a portion of the cryptocurrency reward.

16. The gaming server of claim 9, wherein a hashing algorithm used by each gaming device in the first and second subgroups of the plurality of gaming devices to validate the set of data records representing the digital ledger is a combined proof-of-work and proof-of-stake scheme, wherein the plurality of gaming devices comprise one of an electronic gaming machine (EGM) and electronic gaming table (EGT), wherein the digital ledger is an open distributed ledger, and wherein a selected record in the digital ledger comprises transaction data and a second hash of a second record in the digital ledger and wherein the instructions, when executed by the processor, further cause the processor to:

display by the gaming device a notification that the gaming device in the corresponding first or second subgroup of the plurality of gaming devices is one of operating in the digital ledger validation mode and a cryptocurrency balance of a progressive jackpot associated with the gaming device;

receive a side wager on which of the first or second subgroup of the plurality of gaming devices will be first to generate a hash value that is less than or equal to a target hash value; and when the gaming device in the first subgroup of the plurality of gaming devices that generated the hash value is currently being played by a player, select the player from among multiple players of the plurality of gaming devices to receive at least a portion of the cryptocurrency reward.

17. A method for digital ledger validation in a gaming system, comprising:

assigning, by a processor, to each gaming device in first and second subgroups of a plurality of gaming devices operating in a digital ledger validation mode to validate a set of data records representing a digital ledger, a corresponding set of work units to use in determining a solution to a digital ledger problem, the solution being defined by predetermined criteria;

storing, by the processor, the set of work units assigned to each gaming device in the first and second subgroups of the plurality of gaming devices in a computer readable memory;

receiving, by the processor, a notification that a first gaming device in the first subgroup of the plurality of gaming devices has found the solution satisfying the predetermined criteria and that the gaming device has been awarded a cryptocurrency block and corresponding cryptocurrency award;

storing, by the processor, in a set of data structures an identity of the first gaming device and corresponding cryptocurrency award in the computer readable memory;

determining, by the processor, relative computational contributions of the plurality of gaming devices in the first and second subgroups of the plurality of gaming devices toward a respective work unit;

allocating, based on the relative computational contributions, the cryptocurrency award between the first and second subgroups of the plurality of gaming devices;

generating, by a pseudorandom or random number generator, a random input value;

storing, by the processor, the random input value in the set of data structures in the computer readable memory;

selecting, by the processor based at least in part on the random input value, a gaming device from among the plurality of gaming devices to receive at least a portion of the cryptocurrency award allocated to the first subgroup of gaming devices; and updating, by the processor, the set of data structures to associate the at least a portion of the cryptocurrency award with the identity of the selected gaming device.

18. The method of claim 17, wherein the predetermined criteria comprise a hash value being less than or equal to a target hash value and further comprising:

updating, by the processor, a set of data structures associated with a progressive pool to reflect the at least a portion of the cryptocurrency reward, wherein the set of data structures tracks an amount of cryptocurrency and non-cryptocurrency in the progressive pool, the non-cryptocurrency being from prior gaming events on the first subgroup of the plurality of gaming devices, and wherein, in the updating of the set of data structures associated with an account of a selected player, the set of data structures comprises a cash balance of the account of the selected player and a cryptocurrency balance of a selected player account, the cash balance being independent and different from the cryptocurrency balance.

19. The method of claim 17, wherein the first and second subgroups of the plurality of gaming devices are selected to operate in the digital ledger validation mode based on one of an operating mode of a given gaming device, a game type associated with the given gaming device, a game theme associated with the given gaming device, a player denomination associated with the given gaming device, a total player play associated with the given gaming device, a player maximum bet associated with the given gaming device, an associated player account status, a player decision associated with the given gaming device, an associated player achievement, a bonus trigger associated with the given gaming device, a processing power of the given gaming device, an operating cost of the given gaming device, and a game event associated with the given gaming device, and further comprising:

validating, by the processor, a selected transaction data in the digital ledger against a set of validation rules comprising the predetermined criteria;

when the selected transaction data is successfully validated, executing, by the processor, a hashing algorithm to generate a hash of the selected transaction data and a hash of a second record in the digital ledger; and saving, by the processor, the generated hash in a header of a selected record in the digital ledger, wherein, after successful validation, the selected record in the digital ledger comprises (a) the header comprising the generated hash, the hash of the second record in the digital ledger, a nonce, a target difficulty, a device identifier associated with the corresponding first or second subgroup of the plurality of gaming devices, and a timestamp of when the selected record in the digital ledger was hashed and (b) the selected transaction data.

20. The method of claim 17, wherein a game session on the gaming device being played by a selected player during the selecting has a random or pseudorandom outcome, and further comprising:

updating, by the processor, the set of data structures associated with a central account to reflect the at least a portion of the cryptocurrency reward, wherein the set of data structures tracks an amount of cryptocurrency;

updating, by the processor, a set of data structures associated with a progressive jackpot meter to reflect transfer of the at least a portion of the cryptocurrency reward;

updating, by the processor, the set of data structures associated with the central account to reflect the transfer of the at least a portion of the cryptocurrency reward to the progressive jackpot meter; and causing, by the processor, the digital ledger to be updated to reflect transfer of the at least a portion of the cryptocurrency reward to an electronic address associated with a cryptocurrency wallet of a selected player playing the selected gaming device, the cryptocurrency wallet comprising one of public and private keys and a seed that can be used to receive and spend cryptocurrency.

* * * * *